(12) United States Patent
Brafford, Jr. et al.

(10) Patent No.: US 11,312,042 B2
(45) Date of Patent: Apr. 26, 2022

(54) FORM FOR MAKING STRUCTURES

(75) Inventors: Ralph E. Brafford, Jr., Mooresville, NC (US); Gery Swink, Murrayville, GA (US); Kenneth L. Mahaffey, Lawrenceville, GA (US)

(73) Assignee: ABT FOAM, LLC, Troutman, NC (US)

( * ) Notice: Subject to any disclaimer, the term of this patent is extended or adjusted under 35 U.S.C. 154(b) by 773 days.

(21) Appl. No.: 13/880,585

(22) PCT Filed: Oct. 19, 2011

(86) PCT No.: PCT/US2011/056971
§ 371 (c)(1),
(2), (4) Date: Apr. 10, 2014

(87) PCT Pub. No.: WO2012/054656
PCT Pub. Date: Apr. 26, 2012

(65) Prior Publication Data
US 2014/0217644 A1   Aug. 7, 2014

Related U.S. Application Data

(60) Provisional application No. 61/394,762, filed on Oct. 19, 2010.

(51) Int. Cl.
*B29C 39/26*      (2006.01)
*E03F 3/04*       (2006.01)
(Continued)

(52) U.S. Cl.
CPC ............. *B29C 39/26* (2013.01); *B29C 39/02* (2013.01); *E03F 3/046* (2013.01); *E04G 9/083* (2013.01);
(Continued)

(58) Field of Classification Search
CPC ........... E04G 9/08; E04G 9/083; E04G 9/065; E04G 9/068; E04G 15/061; E04G 15/063; E01C 19/506
See application file for complete search history.

(56) References Cited

U.S. PATENT DOCUMENTS 3,354,180 A * 11/1967 Ekiss ..................... B28B 7/384
                                                      106/12
4,824,068 A      4/1989 Ferland
(Continued)

FOREIGN PATENT DOCUMENTS

EP       1 160 393 A1    12/2001
GB       1 394 238        5/1975
(Continued)

OTHER PUBLICATIONS

International Preliminary Report on Patentability for International Patent Application No. PCT/US2011/056971 dated Apr. 23, 2013.
(Continued)

*Primary Examiner* — Matthew J Daniels
*Assistant Examiner* — Andrew L Swanson
(74) *Attorney, Agent, or Firm* — Moore & Van Allen PLLC; Henry B. Ward, III

(57) ABSTRACT

A form for forming a void or an architectural feature of a predetermined configuration in a moldable forming composition is disclosed. Embodiments of the invention provide an adjustable form body having first and second sides, said form body configurable between a first substantially planar position and a second non-planar position. In some embodiments, the form comprises a surface coating. A form body according to example embodiments of the invention has a plurality of grooves.

27 Claims, 14 Drawing Sheets

(51) Int. Cl.
   *E04G 15/06* (2006.01)
   *E04G 13/02* (2006.01)
   *E04G 9/08* (2006.01)
   *E04G 9/10* (2006.01)
   *B29C 39/02* (2006.01)

(52) U.S. Cl.
   CPC ............ *E04G 9/10* (2013.01); *E04G 13/021* (2013.01); *E04G 15/061* (2013.01); *E04G 15/068* (2013.01)

(56) References Cited

U.S. PATENT DOCUMENTS

| | | | |
|---|---|---|---|
| 5,281,051 A | 1/1994 | Stegall | |
| 5,399,047 A | 3/1995 | Stegall | |
| 5,590,493 A | 1/1997 | Wilson | |
| 5,702,204 A | 12/1997 | Gunter | |
| 6,021,994 A * | 2/2000 | Shartzer, Jr. | E01C 19/502 249/189 |
| 2002/0179808 A1 | 12/2002 | Salinas | |
| 2003/0082009 A1* | 5/2003 | Humphries | E03F 3/046 405/118 |
| 2007/0175141 A1* | 8/2007 | Smith | E04B 5/36 52/336 |

FOREIGN PATENT DOCUMENTS

| | | |
|---|---|---|
| GB | 2 414 031 A | 11/2005 |
| JP | 08219371 | 8/1996 |
| KR | 10-1997-0058894 A | 8/1997 |

OTHER PUBLICATIONS

European Patent Office. Extended European Search Report dated Aug. 8, 2014. European Application No. 11835100.6. Name of Applicant: Brafford, Jr., Ralph. English Language. 10 pages.
Canadian Intellectual Property Office. Canadian Office Action dated Aug. 19, 2014. Canadian Application No. 2,824,603. Name of Applicant: ABT Foam, LLC. English Language. 3 pages.
Korean Intellectual Property Office. PCT International Search Report dated May 29, 2012. International Application No. PCT/US2011/056971. Name of Applicant, Brafford, Jr., Ralph et al. English Language. 5 pages.
The International Bureau of WIPO. PCT International Preliminary Report on Patentability and Written Opinion dated Apr. 23, 2013. International Application No. PCT/US2011/056971. Name of Applicant: Brafford, Jr., Ralph. English Language. 10 pages.
Office Action issued by the European Patent Office for corresponding European Patent Application No. 11835100.6 dated May 18, 2018.
Search Report and Written Opinion issued by the Brazilian Patent and Trademark Office for corresponding Brazilian Patent Application No. BR112013009662-4, dated Jul. 31, 2019.
Office Action issued by the Brazilian Patent Office for Brazilian Patent Application No. BR 11 2013009662-4, dated Jun. 2, 2020.
Office Action issued by the Mexican Patent Office for Mexican Patent Application No. MX/a/2016/017232, dated Jun. 22, 2021.
Communication pursuant to Article 94(3) for related EP Application No. 11835100.6 dated Aug. 25, 2021, 5 pages.

* cited by examiner

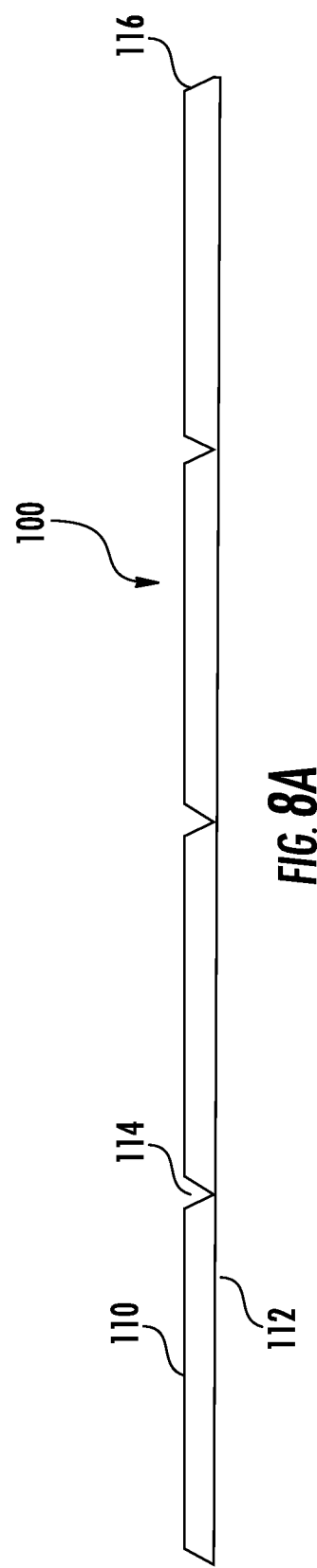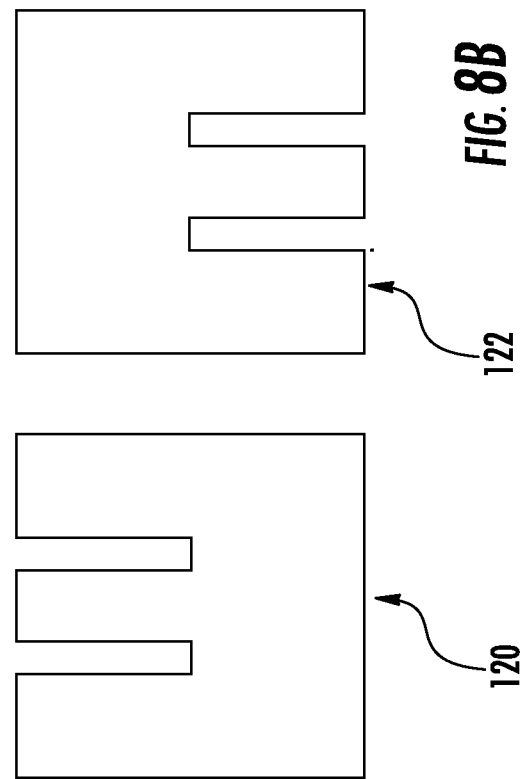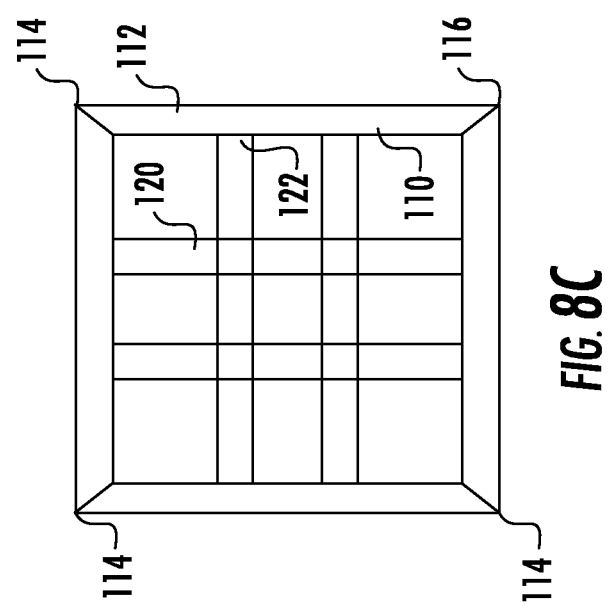

124

124

FORM FOR MAKING STRUCTURES

BACKGROUND

Forms for molding predetermined structures, such as drainage channels and architectural features, have been known for some time. However, there are many steps involved in building the form assembly and many difficulties to overcome before achieving the end result of a drainage channel or architectural feature of predetermined size.

A form for molding a drainage channel must be held firmly in place to resist the pressure exerted by the moldable forming composition and to maintain the predetermined shape of the void comprising the drainage channel. The forms are generally held in place by a frame assembly that must be built on site. Creating an assembly of the right size and shape can be challenging, especially if the drainage channel is of a length requiring multiple form sections to be secured end-to-end in order to obtain the desired length. Forms of the desired size and shape must be manufactured, and a frame assembly must be available for support of each form during the pouring and curing of the moldable forming composition.

The portions of conventional forms that are used to form the voids in a drainage channel are typically destroyed or damaged during the forming process, which can create extensive waste that must be disposed of in a landfill. In order to make such form components removable from the finished drainage channel, the installer must apply a releasing agent to the outside of the component, which can be time consuming.

Forms for molding architectural features have suffered from many of the same drawbacks as those for shaping voids for drainage channels. It has been particularly difficult to build forms configured to create curvilinear architectural features.

Further issues negatively impacting use of typical forms for molding drainage channels and architectural features include the expense and environmental impact of the manufacturing and transport of single-use forms, as well as all of the parts required in frame assemblies for forms of different sizes and shapes.

SUMMARY

Embodiments of the present invention provide forms that are useful in a variety of applications, particularly in the construction industry. The forms of the present invention are useful as forms for creating structures made from a moldable pouring composition. The forms of the present invention are also useful as components of systems for controlling and containing air and fluid flow, including open channel flow and closed channel flow.

Embodiments of the present invention provide forms for forming a void or an architectural feature of a predetermined configuration in a moldable forming composition. Embodiments of the invention provide an adjustable form body having first and second sides, said form body configurable between a first substantially planar position and a second non-planar position. In some embodiments, the form comprises a surface coating.

Embodiments of the present invention provide a form for forming a void of a predetermined configuration in a drainage channel formed using a moldable forming composition. In at least some embodiments, the form comprises a form body having first and second sides, the form body having a plurality of grooves extending from the first side into the form body toward the second side, the plurality of grooves being structured such that the form body may be configured into a non-planar shape corresponding to the predetermined configuration of the void. In one embodiment, the form body is configured into a non-planar shape by increasing the width of the grooves. In another embodiment, the form body is configured into a non-planar shape by decreasing the width of the grooves.

In some embodiments, the form body is made of a lightweight, buoyant material. In some embodiments, the form body is made of an expanded polystyrene.

In some embodiments, the spacing between each of the plurality of grooves is approximately equal. In some embodiments, the spacing between the plurality of grooves varies. In some embodiments, the plurality of grooves are parallel.

In some embodiments, at least one of the plurality of grooves has a tapered configuration or width. In some embodiments, at least one of the plurality of grooves is tapered from the first side toward the second side. In other embodiments, at least one groove has a symmetrical configuration along the depth of the groove and in other embodiments at least one groove has an asymmetrical configuration along the depth of the groove. In still other embodiments, the width of at least one groove is the same along the depth of the groove. In still other embodiments, the width of at least one groove varies along the depth of the groove.

In some embodiments, the form further comprises a surface coating, or covering, on at least one of the first and second sides. In some embodiments, the surface coating is on the side of the form body in contact with the moldable forming composition and is structured not to adhere to the moldable forming composition so that the form body is reusable. In some embodiments, the surface coating is a film having an adhesive backing that will adhere to the adjustable form body and relatively smooth outer surface that preferably has no or limited adherence to the moldable forming composition. In some embodiments, the film may comprise a metal (e.g., aluminum) and/or plastic (e.g., polypropylene or polyester), including metallized plastic. In other embodiments, the surface coating comprises a coating that is sprayed or brushed on, such as a polyeurea or a styrospray (e.g. styrospray 1000). In some embodiments, the surface coating has a low coefficient of friction.

In some embodiments, the non-planar shape comprises a U-shaped configuration.

In some embodiments, the form body comprises a formable portion and a pair of lateral members. In some embodiments, the pair of lateral members and the formable portion are integrally formed. In some embodiments, the pair of lateral members and the formable portion are detachable. In some embodiments, the pair of lateral members are substantially rigid.

In some embodiments, the form further comprises at least one spacer structured to provide support to the form body so as to maintain the form body in the non-planar shape.

In some embodiments, the form further comprises at least one end cap member structured to be positioned at an end of the form body to prevent the moldable forming composition from entering the void and to provide support to the form body so as to maintain the form body in the non-planar shape.

In some embodiments, the form further comprises a cover to be positioned at an end of the form body to prevent the moldable forming composition from entering the void and to provide support to the form body so as to maintain the form body in the non-planar shape.

In some embodiments, at least one of the spacer, the end cap member, and the cover comprises a surface coating on at least one surface.

In some embodiments, the form further comprises a plurality of elongate form bodies positioned end to end.

In some embodiments, the form body is bendable adjacent to the plurality of grooves.

Embodiments of the present invention provide an adjustable form for forming a void of a predetermined configuration in a moldable forming composition. In at least some embodiments, the form comprises an adjustable form body having first and second sides, the adjustable form body having a plurality of grooves extending from the first side into the form body toward the second side, the plurality of grooves being structured such that the adjustable form body may be configured between a first position and a second position, the first position being substantially planar and the second position forming a non-planar shape corresponding to the predetermined configuration of the void predetermined void shape. In one embodiment, the form body is configured into a non-planar shape by increasing the width of the grooves. In another embodiment, the form body is configured into a non-planar shape by decreasing the width of the grooves.

In some embodiments, the adjustable form body is made of a lightweight buoyant material. In some embodiments, the adjustable form body is made of an expanded polystyrene.

In some embodiments, the spacing between each of the plurality of grooves of the adjustable form body is approximately equal. In some embodiments, the spacing between the plurality of grooves of the adjustable form body varies. In some embodiments, the plurality of grooves of the adjustable form body are parallel.

In some embodiments, at least one of the plurality of grooves of the adjustable form body has a tapered configuration. In some embodiments, at least one of the plurality of grooves of the adjustable form body is tapered from the first side toward the second side. In other embodiments, at least one groove has a symmetrical configuration along the depth of the groove and in other embodiments at least one groove has an asymmetrical configuration along the depth of the groove. In still other embodiments, the width of at least one groove is the same along the depth of the groove. In still other embodiments, the width of at least one groove varies along the depth of the groove.

In some embodiments, the adjustable form further comprises a surface coating on at least one of the first and second sides. In some embodiments, the surface coating is on the side of the adjustable form body in contact with the moldable forming composition and is structured not to adhere to the moldable forming composition so that the adjustable form body is reusable. In some embodiments, the surface coating is a film having an adhesive backing that will adhere to the adjustable form body and relatively smooth outer surface that preferably has no or limited adherence to the moldable forming composition. In some embodiments, the film may comprise a metal (e.g., aluminum) or plastic (e.g., polypropylene or polyester), including a metallized plastic. In other embodiments, the surface coating comprises a coating that is sprayed or brushed on, such as a polyeurea or a styrospray (e.g. styrospray 1000). In some embodiments, the surface coating has a low coefficient of friction.

In some embodiments, the non-planar shape of the adjustable form body comprises a U-shaped configuration.

In some embodiments, the adjustable form body comprises a formable portion and a pair of lateral members. In some embodiments, the pair of lateral members and the formable portion of the adjustable form body are integrally formed. In some embodiments, the pair of lateral members and the formable portion of the adjustable form body are detachable. In some embodiments, the pair of lateral members of the adjustable form body are substantially rigid.

In some embodiments, the form further comprises at least one spacer structured to provide support to the adjustable form body so as to maintain the adjustable form body in the non-planar shape.

In some embodiments, the form further comprises at least one end cap member structured to be positioned at an end of the adjustable form body to prevent the moldable forming composition from entering the void and to provide support to the adjustable form body so as to maintain the adjustable form body in the non-planar shape.

In some embodiments, the form further comprises a cover to be positioned at an end of the adjustable form body to prevent the moldable forming composition from entering the void and to provide support to the form body so as to maintain the form body in the non-planar shape.

In some embodiments, at least one of the spacer, the end cap member, and the cover comprises a surface coating on at least one surface.

In some embodiments, the form further comprises a plurality of elongate adjustable form bodies positioned end to end.

In some embodiments, the adjustable form body is bendable adjacent to the plurality of grooves.

Embodiments of the present invention provide an assembly for forming a drainage channel having a void with a predetermined shape using a moldable forming composition. In at least some embodiments, the assembly comprises a form body having first and second sides and a pair of lateral edges, the form body having a plurality of grooves extending from the first side into the form body toward the second side, the plurality of grooves being structured such that the form body may be configured into a non-planar shape corresponding to the predetermined configuration of the void; and a frame for supporting the form body, the frame being attached to the form body adjacent to the lateral edges. In one embodiment, the form body is configured into a non-planar shape by increasing the width of the grooves. In another embodiment, the form body is configured into a non-planar shape by decreasing the width of the grooves.

In some embodiments, the form body of the assembly comprises a formable portion and a pair of lateral members. In some embodiments, the pair of lateral members are integrally formed. In some embodiments, the pair of lateral members are detachable. In some embodiments, the pair of lateral members are substantially rigid.

In some embodiments, the lateral members of the form body of the assembly define a slot at least partially along the length of the form body and wherein the frame comprises a pair of elongate L-shaped members, each of the elongate L-shaped members being structured to engage a corresponding one of the slots in one of the pair of lateral members.

In some embodiments, the form body of the assembly is made of a lightweight buoyant material. In some embodiments, the form body of the assembly is made of an expanded polystyrene.

In some embodiments, the spacing between each of the plurality of grooves of the form body of the assembly is approximately equal. In some embodiments, the spacing between the plurality of grooves of the form body of the assembly varies. In some embodiments, the plurality of grooves of the form body of the assembly are parallel.

In some embodiments, at least one of the plurality of grooves of the form body of the assembly has a tapered configuration. In some embodiments, at least one of the plurality of grooves of the form body of the assembly is tapered from the first side toward the second side. In other embodiments, at least one groove has a symmetrical configuration along the depth of the groove and in other embodiments at least one groove has an asymmetrical configuration along the depth of the groove. In still other embodiments, the width of at least one groove is the same along the depth of the groove. In still other embodiments, the width of at least one groove varies along the depth of the groove.

In some embodiments, the form of the assembly further comprises a surface coating on at least one of the first and second sides. In some embodiments, the surface coating is on the side of the form body in contact with the moldable forming composition and is structured not to adhere to the moldable forming composition so that the form body is reusable. In some embodiments, the surface coating is a film having an adhesive backing that will adhere to the adjustable form body and relatively smooth outer surface that preferably has no or limited adherence to the moldable forming composition. In some embodiments, the film may comprise a metal (e.g., aluminum) or plastic (e.g., polypropylene or polyester), including a metallized plastic. In other embodiments, the surface coating comprises a coating that is sprayed or brushed on, such as a polyeurea or a styrospray (e.g. styrospray 1000). In some embodiments, the surface coating has a low coefficient of friction.

In some embodiments, the non-planar shape of the form body of the assembly comprises a U-shaped configuration.

In some embodiments, the form of the assembly further comprises at least one spacer structured to provide support to the form body so as to maintain the form body in the non-planar shape.

In some embodiments, the form of the assembly further comprises at least one end cap member structured to be positioned at an end of the form body to prevent the moldable forming composition from entering the void and to provide support to the form body so as to maintain the form body in the non-planar shape.

In some embodiments, the form of the assembly further comprises a cover to be positioned across the top of the form body to prevent the moldable forming composition from entering the void and to provide support to the form body so as to maintain the form body in the non-planar shape.

In some embodiments, at least one of the spacer, the end cap member, and the cover comprises a surface coating on at least one surface.

In some embodiments, the form of the assembly further comprises a plurality of elongate form bodies positioned end to end.

In some embodiments, the form body of the assembly is bendable adjacent to the plurality of grooves.

Embodiments of the present invention comprise a method of forming a drainage channel having a void with a predetermined shape using a moldable forming composition. The method comprises preparing a trench; providing a form body having first and second sides and a pair of lateral edges, the form body having a plurality of grooves extending from the first side into the form body toward the second side, the plurality of grooves being structured such that the form body may be configured into a non-planar shape corresponding to the predetermined configuration of the void; attaching a frame to the form body adjacent to the lateral edges of the form body, the frame being structured to support the form body; positioning the form body and frame in the trench; pouring a moldable forming composition in the trench about the form body; curing the moldable forming composition to form the drainage channel; and removing the form body. In one embodiment, the form body is configured into a non-planar shape by increasing the width of the grooves. In another embodiment, the form body is configured into a non-planar shape by decreasing the width of the grooves.

In some embodiments, the attaching step of the method comprises engaging an elongate L-shaped member into a corresponding slot in a lateral member of the form body.

In some embodiments, the pouring step of the method comprises pouring a first amount of moldable forming composition in the trench so as to cover the base of the frame; at least partially curing the first amount of moldable forming composition; and pouring a second amount of moldable forming composition in the trench about the form.

In some embodiments, the method further comprises inserting at least one spacer structured to provide support to the form body so as to maintain the form body in the non-planar shape.

In some embodiments, the method further comprises inserting at least one end cap member structure to be positioned at an end of the form body to prevent the moldable forming composition from entering the void and to provide support to the form body so as to maintain the form body in the non-planar shape.

In some embodiments, the method further comprises inserting a cover to be positioned across the top of the form body to prevent the moldable forming composition from entering the void and to provide support to the form body so as to maintain the form body in the non-planar shape.

In some embodiments, the form body provided by the method of the invention comprises a formable portion and a pair of lateral members. In some embodiments, the pair of lateral members are integrally formed. In some embodiments, the pair of lateral members are detachable and the method further comprises attaching the pair of lateral members to the formable portion. In some embodiments, the pair of lateral members are substantially rigid.

In some embodiments, the method further comprises attaching the end of one form body to the end of an adjacent form body.

Embodiments of the present invention provide a form for forming an architectural feature of a predetermined configuration with a moldable forming composition. In at least some embodiments, the form comprises a form body comprising expanded polystyrene with a coating on at least one surface of the form body, wherein the form body is configured in a predetermined shape that results in creation of an architectural feature when a moldable forming composition is added.

In some embodiments, the architectural feature is a linear feature. In some embodiments, the architectural feature is a curvilinear feature.

In some embodiments, the form is structured to create a void of predetermined configuration for receiving the moldable forming composition.

In some embodiments, the form further comprises a solid form body and the moldable forming composition is poured over the form to create the architectural feature.

In some embodiments, the form further comprises a support feature. In some embodiments, the support feature is selected from the group consisting of a metal support, a plastic support and a wooden support. In some embodiments, the support feature is selected from the group consisting of a metal grating and a rebar.

In some embodiments, the form further comprises a form body having first and second sides, said form body having a plurality of grooves extending from said first side into said form body toward said second side, said plurality of grooves being structured such that said form body may be configured into a non-planar shape corresponding to the predetermined configuration of the architectural feature. In one embodiment, the form body is configured into a non-planar shape by increasing the width of the grooves. In another embodiment, the form body is configured into a non-planar shape by decreasing the width of the grooves.

Embodiments of the present invention provide a form for forming an architectural feature of a predetermined configuration in a moldable forming composition, comprising an adjustable form body having first and second sides, said form body configurable between a first position and a second position, the first position being substantially planar and the second position forming a non-planar shape corresponding to the predetermined configuration of the architectural feature shape. In some embodiments, the form body is made of an expanded polystyrene. In some embodiments, the form body further comprises a surface coating on at least one of the first and second sides. In some embodiments, the architectural feature is a curvilinear feature.

Embodiments of the present invention provide a form for components of an air flow system, such as an HVAC system. In some embodiments the invention provides a form for forming a component of a predetermined configuration for an HVAC system, comprising a form body having first and second sides, the form body having a plurality of grooves extending from the first side into the form body toward the second side, the plurality of grooves being structured such that the form body may be configured into a non-planar shape corresponding to the predetermined configuration of the HVAC component. In one embodiment, the form body is configured into a non-planar shape by increasing the width of the grooves. In another embodiment, the form body is configured into a non-planar shape by decreasing the width of the grooves.

In some embodiments, the form body is made of an expanded polystyrene.

In some embodiments, the spacing between each of said plurality of grooves is approximately equal. In some embodiments, the spacing between said plurality of grooves varies. In some embodiments, the plurality of grooves are parallel.

In some embodiments, at least one of said plurality of grooves has a tapered configuration. In some embodiments, at least one of said plurality of grooves is tapered from the first side toward the second side. In other embodiments, at least one groove has a symmetrical configuration along the depth of the groove and in other embodiments at least one groove has an asymmetrical configuration along the depth of the groove. In still other embodiments, the width of at least one groove is the same along the depth of the groove. In still other embodiments, the width of at least one groove varies along the depth of the groove.

In some embodiments, the form further comprises a surface coating on at least one of said first and second sides. In some embodiments, the surface coating conveys a smooth texture to the surface on which is it placed. In some embodiments, the surface coating has a low coefficient of friction.

In some embodiments, the predetermined configuration is tubular or pipe-shaped.

In some embodiments, the predetermined configuration is maintained by using a permanently flexible adhesive or adhesive tape.

Embodiments of the invention provide a form for forming a component of a predetermined configuration for an HVAC system. In some embodiments, the form comprises an adjustable form body having first and second sides, the form body having a plurality of grooves extending from the first side into the form body toward the second side, the plurality of grooves being structured such that the form body may be configured between a first position and a second position, the first position being substantially planar and the second position forming a non-planar shape corresponding to the predetermined configuration of the HVAC component. In one embodiment, the form body is configured into a non-planar shape by increasing the width of the grooves. In another embodiment, the form body is configured into a non-planar shape by decreasing the width of the grooves.

Thus, there is provided a form, an assembly and associated methods for forming a void in a drainage channel or for forming an architectural feature that minimizes the expense and environmental impact of the manufacturing and transport associated with the forms, and provides a single form that can be used to configure different sizes and shapes of voids or architectural features. The form of the present invention further provides components for an air flow system, such as an HVAC system, that minimizes expense and environmental impact of manufacturing and transport associated with the components.

BRIEF DESCRIPTION OF THE DRAWINGS

FIGS. 8A-8E are views illustrating a form for forming an architectural feature of predetermined configuration in a moldable forming composition, according to one embodiment of the present invention;

DETAILED DESCRIPTION

Figure 1A:
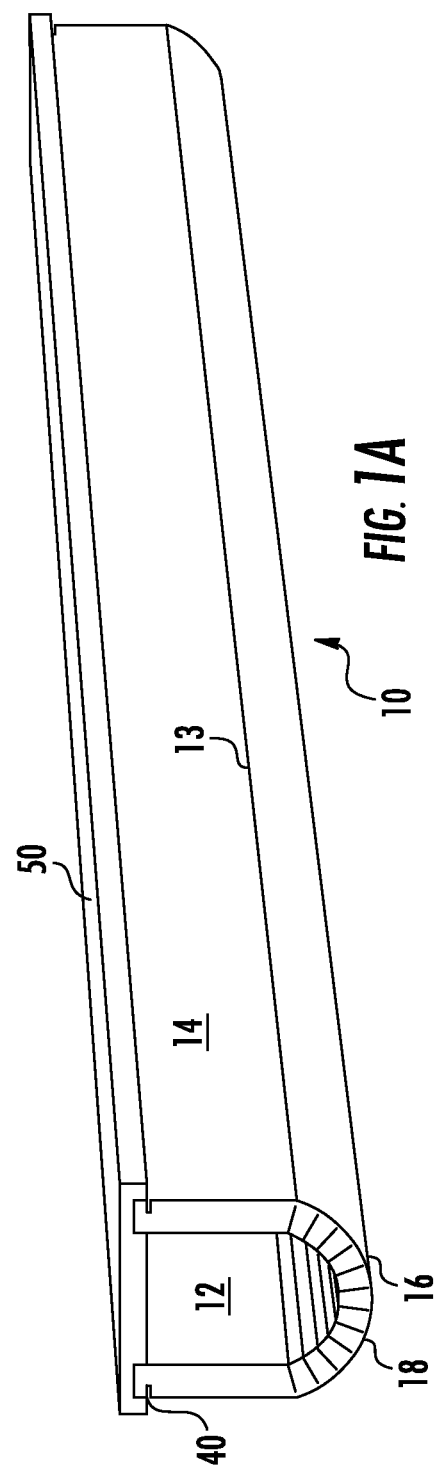
FIG. 1A is a perspective view illustrating a form for forming a void of predetermined configuration in a moldable forming composition, according to one embodiment of the present invention wherein the form is configured in a non-planar configuration.

The following detailed description refers to the accompanying drawings, which illustrate specific embodiments of the invention. Other embodiments having different structures and operation do not depart from the scope of the present invention.

Embodiments of the invention are described with reference to drawings included herewith. Like reference numbers refer to like structures throughout. It should be noted that the drawings are schematic in nature. Not all parts are always shown to scale. The drawings illustrate but a few specific embodiments of the invention.

Embodiments of the invention provide an adjustable form body having first and second sides, said form body configurable between a first substantially planar position and a second non-planar position. In embodiments, the form comprises a surface coating.

Embodiments of the present invention provide forms that are useful in a variety of applications, particularly in the construction industry. The present invention provides forms that are lightweight, easily manipulated, and easily stored and shipped. The forms of the present invention are adjustable on the job site with available tools, allowing for efficient manufacturing, transport, and use. The forms of the present invention are useful as forms for creating structures made from a moldable pouring composition. The forms of the present invention are also useful as components of systems for controlling and containing air and fluid flow, including open channel flow and closed channel flow. The forms of the present invention are further useful for creating reusable packaging, due to the flexibility and adaptability of the forms.

Embodiments of the present invention provide a form for forming a void of a predetermined configuration in a moldable forming composition. In at least some embodiments, the form comprises a form body having first and second sides, the form body having a plurality of grooves extending from the first side into the form body toward the second side, the plurality of grooves being structured such that the form body may be configured into a non-planar shape corresponding to the predetermined configuration of the void. In some embodiments of the present invention, the form body is elongate to a predetermined length that can vary based upon the specific requirements and specifications of the drainage channel to be formed, as well as shipping and manufacturing considerations.

U.S. Pat. No. 5,281,051, issued on Jan. 25, 1994 and entitled "Trench Forming Assembly and Method" and U.S. Pat. No. 5,399,047, issued on Mar. 21, 1995 and entitled "Trench Forming Assemblies Having Enhanced Anchoring Means" disclose many aspects of forming a void of a predetermined configuration in a moldable forming composition, and the contents of each are herein incorporated by reference in their entirety.

The form of the invention for forming a void of a predetermined configuration in a moldable forming composition offers a number of advantages. It can exist in a planar shape, making it easy to stack, package, ship, handle, and cut or otherwise reshape on the work site. It comprises less volume than a solid, pre-shaped form that could be used to form a drainage channel of the same dimensions, as the form of the invention is hollow when configured into the desired non-planar shape and, advantageously, may be placed in a planar configuration when shipping to conserve space. In addition, the form of the present invention can be shaped to any dimension desired, as the shapes and dimensions possible to be achieved with the form of the present invention are unlimited with respect to what might be desired for any specific use. A further advantage of the form of the present invention is the ease with which it is adjusted or resized on the work site. The form is easily manipulated and cut to meet on-site requirements as they arise. The material of the form is amenable to cuts of any shape, including wavy or curvilinear cuts, as well as linear cuts, further increasing the adaptability and usefulness of the forms of the present invention.

Further embodiments of the present invention provide an adjustable form for forming a void of a predetermined configuration in a moldable forming composition. In at least some embodiments, the form comprises an adjustable form body having first and second sides, the adjustable form body having a plurality of grooves extending from the first side into the form body toward the second side, the plurality of grooves being structured such that the adjustable form body may be configured between a first position and a second position, the first position being substantially planar and the second position forming a non-planar shape corresponding to the predetermined configuration of the void predetermined void shape.

The void of the invention defines a channel for collecting and directing fluid, such as storm water run off or other excess fluid in a desired direction. In at least some embodiments, a single form of the present invention is adaptable for use in forming voids encompassing a range of different shapes and sizes. The form body of the invention is adjustable to a multitude of non-planar positions, any of which could be used in forming a void. In at least some embodiments, the form body is flexible and/or bendable. Flexibility and bendability increase the ease of working with the form body on site for configuring it to the predetermined shape when the drainage channel forming assembly is built. In at least some embodiments, the form is removable after the drainage channel is formed and in some embodiments the form is reusable, or at least some of the form components are reusable. Not only is the shape of the form easily adapted by bending or flexing, the form is also easily cut or reshaped at the work site, further increasing the adaptability and usefulness of the form. In at least some embodiments, the form is made of a lightweight material, thereby furthering the ease with which the form is manipulated.

Further embodiments of the present invention provide an assembly for forming a drainage channel having a void with a predetermined shape using a moldable forming composition. The components of the assembly, such as the frame, can be made of any available materials, including but not limited to metal, wood, fiberglass, aluminum, cast iron, and plastic.

In at least some embodiments, the assembly comprises a form body having first and second sides and a pair of lateral edges, said form body having a plurality of grooves extending from said first side into said form body toward said second side, said plurality of grooves being structured such that the form body may be configured into a non-planar shape corresponding to the predetermined configuration of the void; and a frame for supporting the form body, the frame being attached to the form body adjacent to the lateral edges. In one embodiment, the form body is configured into a non-planar shape by increasing the width of the grooves. In another embodiment, the form body is configured into a non-planar shape by decreasing the width of the grooves.

In some embodiments, the frame for supporting the form body of the assembly comprises a pair of elongate members for supporting a cover, such as a grate. In some embodiments, the frame assembly further comprises legs joined to the frame and serving to anchor the frame assembly during the pouring and setting of the moldable forming composition. In some embodiments, the legs are vertical legs. In some embodiments, the legs join together at their lower portion, thereby forming a U-shaped leg structure ("U-legs") for anchoring the frame and thus the form body in a predetermined location. See FIGS. 4-7 for exemplary embodiments of the frame assembly, and see FIGS. 4-5 for examples of the U-legs. Such frame assemblies are also fully described in U.S. Pat. Nos. 5,281,051 and 5,399,047, both of which are incorporated herein by reference in their entirety.

The frame for supporting the form body of the present invention is highly variable. The frame serves to hold the form body in place when the moldable forming composition is added to the form body, and to stabilize the form body to prevent wavering, twisting, or other forms of distortion that could occur during the forming process. Frames and support systems discussed herein are presented as exemplary embodiments only, and one of ordinary skill in the art recognizes that other frames or support systems not described herein are encompassed by the scope of the invention.

In some embodiments, the forms are fitted into a frame to anchor the form and to hold the form in place when the moldable forming composition is added. In some embodiments, the frame includes a pair of elongate L-shaped frame members. In some embodiments, the form body is secured to the frame by slots in the form body that correspond to the pair of elongate L-shaped frame members.

In some embodiments, each of the pair of elongate L-shaped frame members are attached to the frame by mechanical fasteners, such as brackets or bolts. In some embodiments, the frame, including the pair of elongate L-shaped frame members, remains in place after the moldable forming composition is cured. In some embodiments, the pair of elongate L-shaped frame members are removable. In some embodiments, the removable elongate L-shaped frame members are reusable after removal.

In some embodiments, the frame or support system lacks the pair of elongate L-shaped frame members but provides an anchor system, such as vertical legs or U-legs. In embodiments lacking the pair of elongate L-shaped frame members, the anchor system, such as the legs, can be directly inserted into or attached to the form body. In some embodiments, the form bodies are used to retrofit a trench or architectural feature such as a catch basin or mechanical chase in an existing structure by "hanging" the form bodies from an existing structure of creating a new form structure overhanging the catch basin or mechanical chase rather than providing a frame or anchor system including legs.

In some embodiments, the form body of the assembly comprises a formable portion and a pair of lateral members. In some embodiments, the pair of lateral members are integrally formed. In some embodiments, the pair of lateral members are detachable. In some embodiments, the pair of lateral members are substantially rigid. In at least some embodiments, the formable portion comprises a plurality of grooves. In at least some embodiments, the pair of lateral members are not comprised of a plurality of grooves. The formable portion and/or the pair of lateral members can be elongate.

In some embodiments, the lateral members of the assembly define a slot at least partially along the length of the form body and wherein the frame comprises a pair of elongate L-shaped members, each of the elongate L-shaped members being structured to engage a corresponding one of the slots in one of the pair of lateral members.

Figure 1B:
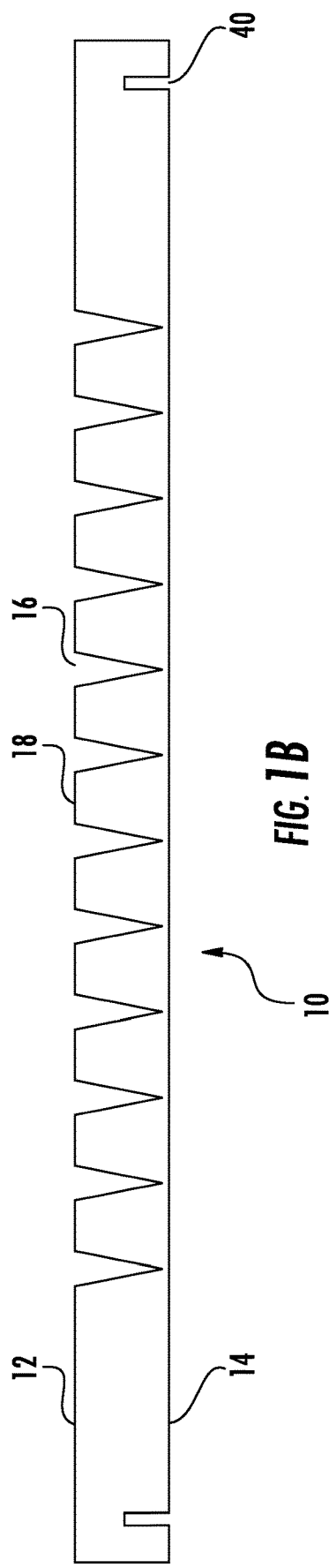
FIG. 1B is an elevational view illustrating a form for forming a void of predetermined configuration in a moldable forming composition, according to one embodiment of the present invention, wherein the form is in a planar configuration.
Figure 2:
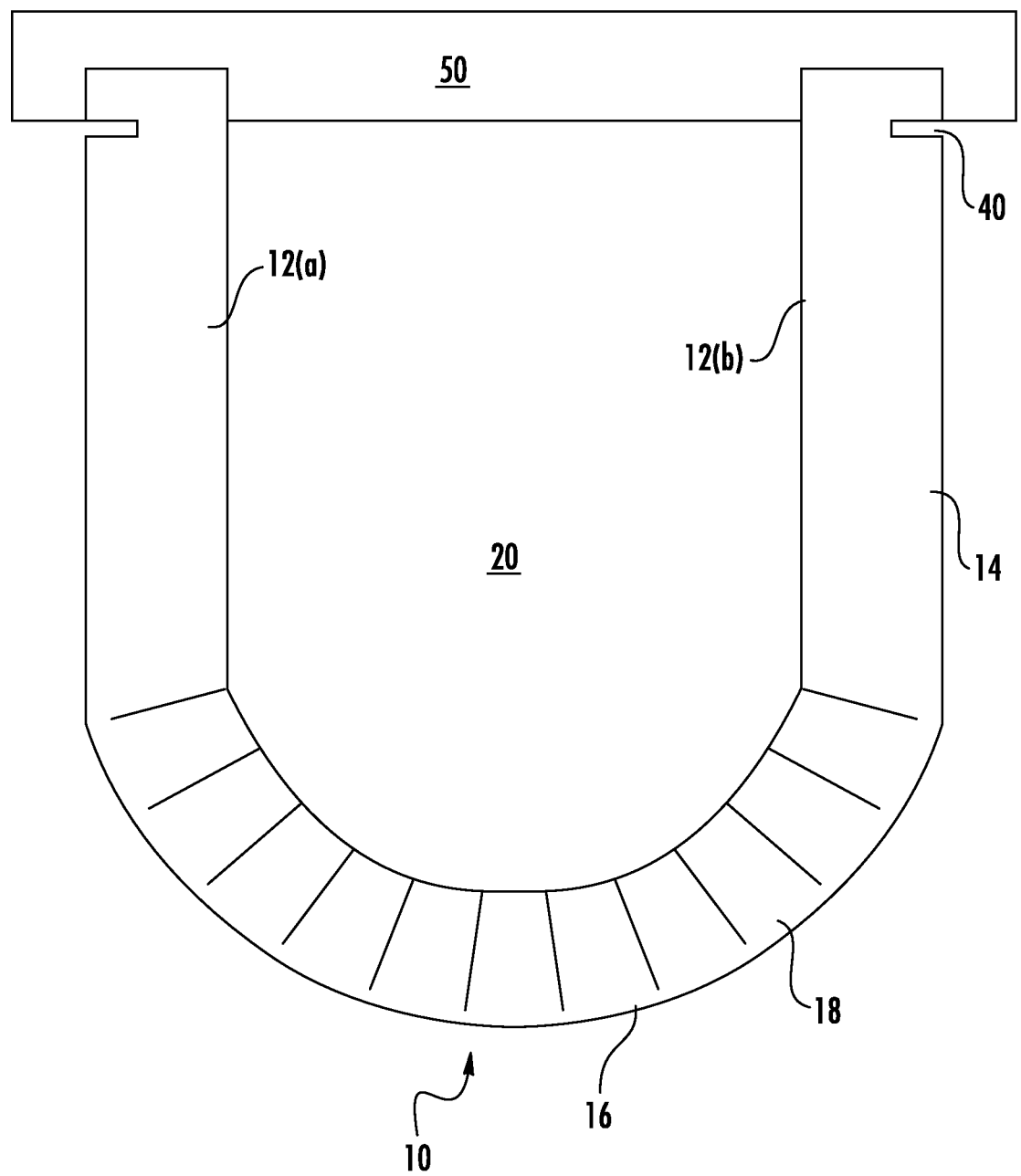
FIG. 2 is an end view illustrating a form for forming a void of predetermined configuration in a moldable forming composition, according to one embodiment of the present invention.

The slots of the present invention can be seen in FIGS. 1 and 2 of the present application. An embodiment of a frame structured to engage a slot as described above is also shown, for example, in FIG. 1 of U.S. Pat. No. 5,281,051, wherein elongate L-shaped frame members are positioned in slots of a form body. Another example is shown in FIG. 1 of U.S. Pat. No. 5,399,047, wherein elongate frame members are positioned in slots of a form body. At least some embodiments of the form body of the present invention could be substituted for the form body in the frame structure shown in FIG. 1 of U.S. Pat. No. 5,281,051 or FIG. 1 of U.S. Pat. No. 5,399,047.

In various embodiments, the form body of the assembly may comprise any of the features disclosed herein for a form body of the invention.

In some embodiments, the form body of the invention is bendable adjacent to the plurality of grooves. The grooves serve at least in part to characterize the nature and degree of bendability of the form body, enabling it to adjust from a planar position to a non-planar position. The number of grooves, the height, width and depth of the grooves, and the spacing between the grooves all affect the bendability of the form body. All of these dimensions can be varied by one of ordinary skill in the art with the resulting form still falling with the scope of the present invention. Flexibility can also be imparted to the form body by the plurality of grooves. This flexibility results in greater adjustability and can improve the durability of the form body as it can give slightly, without breaking, under the load created by the moldable forming composition when forming the drainage channel.

Further, in some embodiments, at least one of the plurality of grooves has a tapered configuration. In some embodiments, at least one of the plurality of grooves is tapered from the first side of the form body toward the second side of the form body. In other embodiments, at least one groove has a symmetrical configuration along the depth of the groove and in other embodiments at least one groove has an asymmetrical configuration along the depth of the groove. In still other embodiments, the width of at least one groove is the same along the depth of the groove. In still other embodiments, the width of at least one groove varies along the depth of the groove. Just as the grooves serve in part to characterize the nature and degree of bendability of the form body, so too does the configuration of each individual groove affect the bendability of the form body. One of skill in the art recognizes that a more tapered configuration of a groove allows for more bending of the form, while a less tapered configuration of a groove allows for less bending of the form.

In some embodiments, the form body of the invention further comprises a surface coating on at least one of the first and second sides. In some embodiments, the surface coating is on the side of the form body in contact with the moldable forming composition and is structured not to adhere to the moldable forming composition so that the form body is reusable. In some embodiments, the surface coating is added to the form surface prior to cutting the plurality of grooves. In some embodiments, the surface coating is added to the form surface after cutting the plurality of grooves.

In some embodiments, the surface coating is a film having an adhesive backing that will adhere to the adjustable form body and relatively smooth outer surface that preferably has no or limited adherence to the moldable forming composition. In some embodiments, the film comprises a metal (e.g., aluminum) or plastic (e.g., polypropylene or polyester), or comprises a metallized plastic. In other embodiments, the surface coating comprises a coating that is sprayed or brushed on, such as a polyeurea or a styrospray (e.g. styrospray 1000). In some embodiments, the surface coating is a paper. In some embodiments, the paper is kraft paper. Other surface coatings or films are recognized by those of skill in the art, and are encompassed by the scope of the present invention. The examples presented herein are not intended to be limiting.

Release of the form from the moldable forming composition after the void is formed and the moldable forming composition is set is necessary in order to complete the formation of the void. The moldable forming composition adheres to the form if measures are not taken to prevent adherence. Prior to the present invention, the form may have been coated with a releasing compound prior to contact with the moldable forming composition to prevent adherence. The surface coating of the present invention substantially reduces or prevents adherence of the moldable forming composition to the form, thereby removing the need to coat the form with a releasing compound before positioning the form body in the form assembly and adding the moldable forming composition. Because the forms of the present invention may be placed in a planar configuration, if a surface coating is to be brushed or sprayed on, it may be "pre-applied" or applied at the time of forming and then the forms stacked in a manner that will protect the coating. With conventional forms, any pre-applied coating is subject to abrasion and damage because of the difficulty in stacking the pre-shaped forms and preventing movement of the forms relative to one another.

In some embodiments, the surface coating of the present invention that prevents adherence of the moldable forming composition to the form is applied in a thicker coat than a surface coating applied for other reasons. In some embodiments, the surface coating applied in a thicker coat enhances the ability of the form body to survive being used more than once. Thus, for example, form bodies intended to be reusable may have a thicker, more durable surface coating than a form body meant for a single use.

In at least some embodiments, the surface coating is used to convey a desired surface texture to the finished formed product. In some embodiments, the desired surface is a smooth surface. In some embodiments, the desired surface is a rough or textured surface.

For example, in a drainage system, a smooth surface is usually desired. As is well known to those of ordinary skill in the art and according to Manning's coefficient of roughness, the texture of the surface over which fluid passes affects the velocity at which the fluid moves. In some embodiments, the surface coating has a low coefficient of friction. Thus, in a drainage system, a smoother surface in trenches, catch basins, and other surfaces over which the fluid passes results in the fluid moving at higher velocity. Not only is a higher velocity conducive to creating a drainage system which removes fluid quickly and efficiently, it also creates a drainage system that is "self-cleaning" and, thus, maintains an efficient fluid flow. In other words, a smooth surface which provides few opportunities for grass, leaves and other debris to be snagged and stuck in the system allows fluid to flow freely. The same principles apply to any system through which fluid or air is meant to flow freely, such as, for example, an HVAC system.

The efficiency of drainage systems as described herein is further enhanced by incorporating filter systems. Filter systems can include features such as, but not limited to, materials to be attached to the insides of the voids of the drainage system (i.e., trenches, catch basins, etc.) that absorb liquids like gasoline or oil, and screens to be placed strategically along the drainage system. The screens are placed to catch debris such as leaves or grass that might otherwise clog the drainage system and slow the velocity of the liquid flow.

In some embodiments of the present invention, absorbent materials are attached to the form assemblies for incorporation into a trench or a catch basin. In some embodiments, holders or other means for attaching screens are included in the forms of the present invention. In the case of the screens, the holders or means for attaching screens are incorporated into the form assembly such that the screens are easily placed into the system when the moldable forming composition is cured and the void is formed.

The non-planar shape into which the form of the invention is configured may be any shape desired for a void, or trench. The void, or trench, has a base which is the lowest point or the point at which liquids would naturally converge. The shapes desired for a void include, but are not limited to, square, rectangular, round, semi-circular, V-shaped, triangular, or U-shaped.

In some embodiments, the non-planar shape comprises a U-shaped configuration. The U-shape may comprise any shape wherein the sidewalls of the "U" are at an angle from the base of the void that is either greater than, less than, or equal to 90 degrees.

The predetermined non-planar shape into which the form of the invention is configured results in formation of a void of the predetermined shape after the moldable forming composition is poured around the form and is allowed to cure or set. The form body has two sides, a first side and a second side. When the form is configured into a non-planar shape for forming a void, the first side of the form body comprises opposed side surfaces that face one another, thus defining a portion of the void between them. The void 20 and the opposed side surfaces 12(*a*) and 12(*b*) can be seen in FIG. 2. The second side of the form body is in contact with the moldable forming composition when the moldable forming composition is poured. After the moldable forming composition is poured and has cured, the form is removed. At that time, the void will achieve its full dimensions which include the portion of the void defined between the opposed side surfaces of the first side and the portion of the void occupied during the forming process by the form body, with the void's outer dimensions created by the second side of the form body.

In some embodiments, the form body of the invention comprises a formable portion and a pair of lateral members. In some embodiments, the pair of lateral members and the formable portion are integrally formed. In some embodiments, the pair of lateral members and the formable portion are detachable. For instance, the pair of lateral members and the formable portion can be attached via a slidable tongue and groove or similar connection or using mechanical fasteners. In some embodiments, the lateral members are substantially rigid.

In some embodiments, the detachable lateral members are stackable upon one another in the form assembly, enabling the formation of a void of greater dimensions without requiring larger segments of the form assembly. The stacked lateral members can be attached similarly to the attachment of the detachable lateral members to the formable portion. Thus, the stacked lateral members can be attached via a slidable tongue and groove or similar connection or using mechanical fasteners.

A formable portion that is detachable from a pair of lateral members enables an assembly in which a pair of lateral members can be used with different formable portions which can be of different sizes and dimensions. In embodiments where the form body is reusable, this is a useful feature as the same pairs of lateral members can be used for forming voids of different shapes and sizes.

Lateral members that can be used with formable portions of different sizes decrease manufacturing costs, as more of the lateral members can be manufactured in the same size and thus can be produced by the same manufacturing process and tooling. Elimination of tooling changes can significantly decrease manufacturing costs. Having a reduced number of sizes of lateral members can also reduce the amount of inventory space required, further reducing costs. Lateral members that can be used with formable portions of different sizes may also result in decreases in the number of form body components that need to be purchased, packaged, shipped, and/or stored. Another advantage of a form body comprising a formable portion that is detachable from a pair of lateral members is that it results in smaller components than a form body comprising a formable portion and a pair of lateral members that are integrally formed. Smaller components are easier to handle than larger ones during manufacturing, packaging, shipping, use, and storage.

The thickness of the form body may vary with the size of the void to be formed. In some embodiments, the form body is thicker if a larger void is to be formed and thinner if a smaller void is to be formed. The thickness of the form body affects how big each groove can be. In some examples, the thickness of the form body is from one quarter of an inch to four inches. However, this range is not meant to be limiting, and one of skill in the art understands that all dimensions of the form body and the grooves are adjusted according to the configurations of the voids desired. Further, all dimensions of the frame assembly are also variable and are adjusted according to the configurations of the voids desired.

Figure 3:
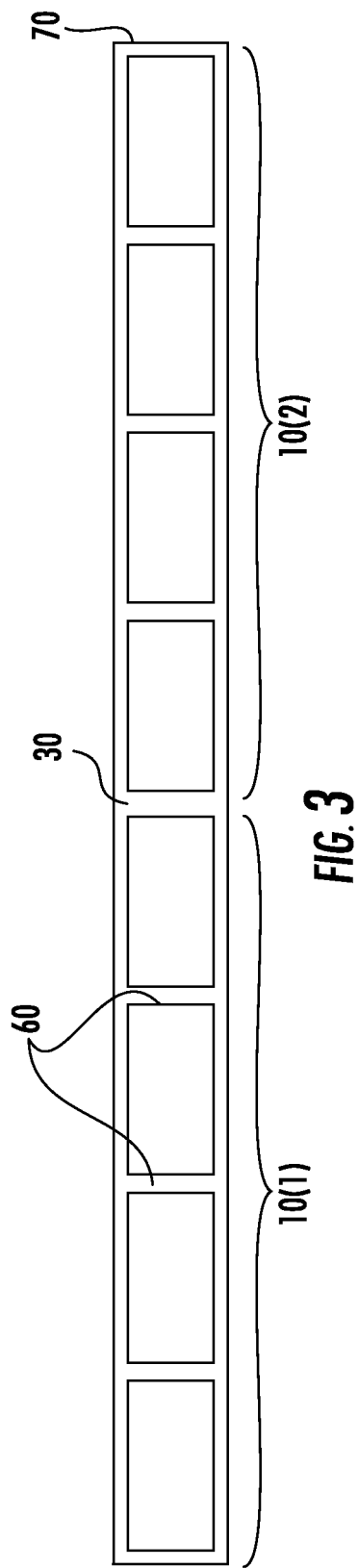
FIG. 3 is a top-cutaway view illustrating a form for forming a void of predetermined configuration in a moldable forming composition, according to one embodiment of the present invention.

In some embodiments, the form of the invention further comprises at least one spacer structured to provide support to the form body so as to maintain the form body in the non-planar shape, particularly when the moldable forming composition is added to form the void. As illustrated in FIG. 3, the spacer 60 is located on the side of the form body opposite the side meant to contact the moldable forming composition. The spacer 60 may take a variety of shapes, dictated at least in part by the non-planar shape of the form body.

In one example, a U-shaped non-planar form body shape receives a U-shaped spacer. In another example, a square non-planar form body shape receives a square spacer. Other non-planar form body shape and spacer combinations, and other spacer shapes, may be made by those of ordinary skill in the art and still fall within the scope of the present invention.

In some embodiments, the spacer only comes in contact with the surface area of the side of the form body opposite the side touching the formable molding composition at its widest and deepest points, while in other embodiments more contact is maintained between the spacer and the form body. (See, for example, spacer 60 of FIGS. 4-7.) Other non-planar form body shape and spacer combinations, and spacer shapes, may be made by those of ordinary skill in the art and still fall within the scope of the present invention. The spacer may be made of the same material as the form body or may be made of a different material. In one embodiment, the spacer is made of masonite or an equivalent or a fiber board laminated to expanded polystyrene.

In some embodiments, at least one side of the spacer is covered with a surface covering, or coating. In some embodiments, the surface coating is a film having an adhesive backing that will adhere to the spacer and have a relatively smooth outer surface that preferably has no or limited adherence to the moldable forming composition. In some embodiments, the film comprises a metal (e.g., aluminum) or plastic (e.g., polypropylene or polyester), or a metallized plastic. In other embodiments, the surface coating comprises a coating that is sprayed or brushed on, such as a polyeurea or a styrospray (e.g. styrospray 1000).

In some embodiments, the form of the present invention further comprises at least one end cap member (such as the end cap member 70 illustrated in FIGS. 4-7) structured to be positioned at an end of the form body to prevent the moldable forming composition from entering the void and to provide support to the form body so as to maintain the form body in the non-planar shape. As with the spacer, the end cap member may take a variety of shapes, dictated at least in part by the non-planar shape of the form body.

The end cap member may be made of the same material as the form body or may be made of a different material. In some embodiments, the end cap member is made of a masonite or its equivalent or a fiberboard laminated to expanded polystyrene. In some embodiments, the end cap member is made of the same material as the form body.

In some embodiments, at least one side of the end cap member is covered with a surface covering. In some embodiments, the side of the end cap member covered with a surface covering is the side in contact with the formable molding composition. In some embodiments, the surface coating is a film having an adhesive backing that will adhere to the adjustable form body and relatively smooth outer surface that preferably has no or limited adherence to the moldable forming composition. In some embodiments, the film comprises a metal (e.g., aluminum) or plastic (e.g., polypropylene or polyester), or a metallized plastic. In other embodiments, the surface coating comprises a coating that is sprayed or brushed on, such as a polyeurea or a styrospray (e.g. styrospray 1000).

In one example, a U-shaped non-planar form body shape is capped with a U-shaped end cap member. In another example, a square non-planar form body shape is capped with a square end cap member. Other non-planar form body shape and end cap member combinations, and other end cap member shapes, may be made by those of ordinary skill in the art and still fall within the scope of the present invention.

Figure 4:
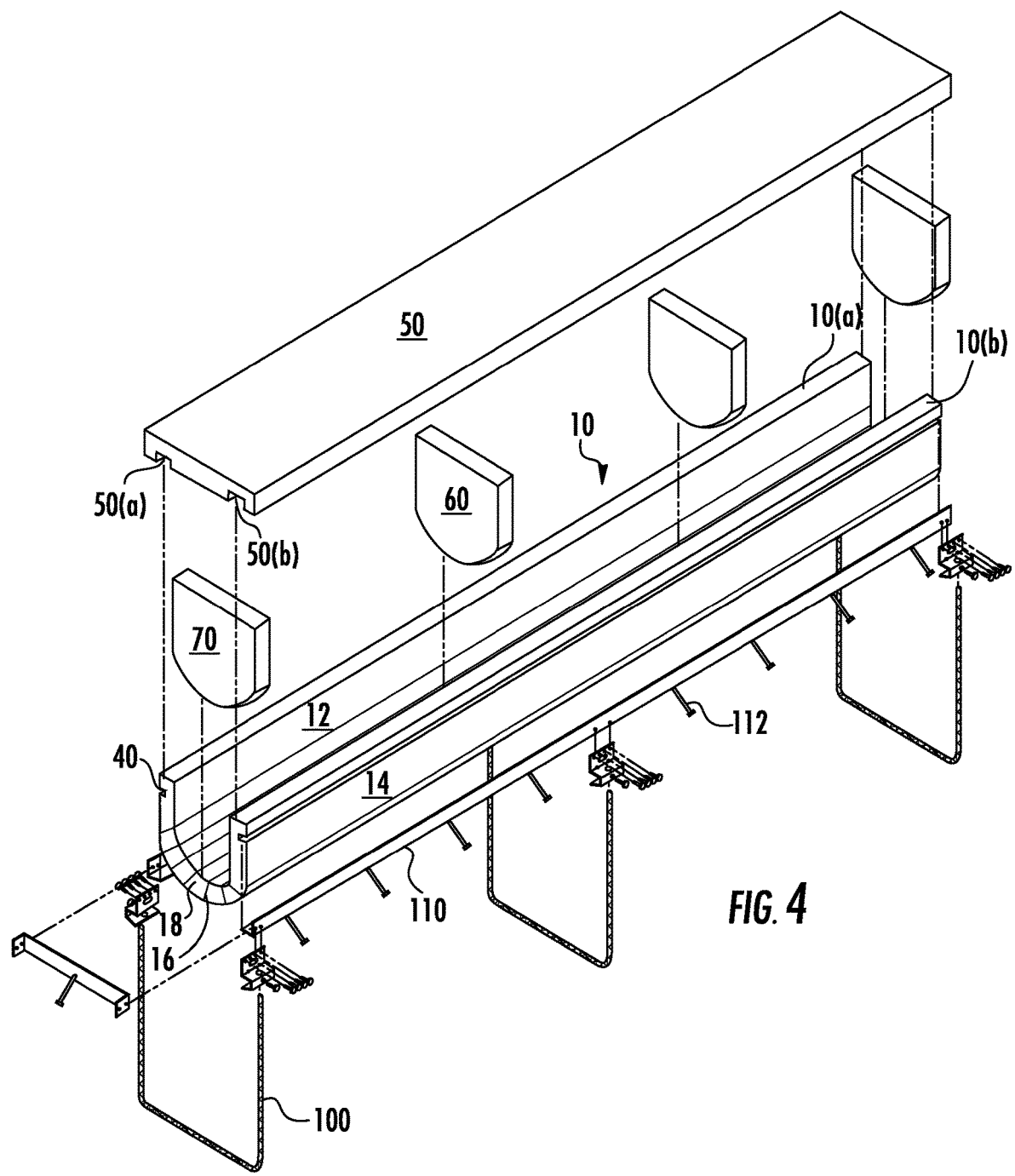
FIG. 4 is an exploded-perspective view illustrating a form for forming a void of predetermined configuration in a moldable forming composition, according to one embodiment of the present invention.

In some embodiments, the form of the invention further comprises a cover to be positioned on the form body to prevent the moldable forming composition from entering the void and to stabilize the form during the molding process. One example of a cover 50 is illustrated in FIG. 4. The cover may be made from the same material as the form body or may made from a different material from the form body.

In some embodiments, at least one side of the cover is covered with a surface covering. In some embodiments, the surface coating is a film having an adhesive backing that will adhere to the adjustable form body and relatively smooth outer surface that preferably has no or limited adherence to the moldable forming composition. In some embodiments, the film comprises a metal (e.g., aluminum) or plastic (e.g., polypropylene or polyester), or a metallized plastic. In other embodiments, the surface covering comprises a coating that is sprayed or brushed on, such as a polyeurea or a styrospray (e.g. styrospray 1000).

In some embodiments, the form of the invention further comprises a plurality of elongate form bodies positioned end-to-end. In some embodiments, the ends are secured together using mechanical fasteners, adhesives such as adhesive tapes or the like. In some embodiments, the plurality of elongate form bodies positioned end-to-end are attached by an alignment block 30 at each joining point, as shown in FIG. 3.

In some embodiments, the form for forming a void of a predetermined configuration in a moldable forming composition is used to create a utility or mechanical trench. The form for forming a void of a predetermined configuration in a moldable forming composition to create a utility or mechanical trench further comprises devices, such as brackets or studs, embedded in the form body to which pipes or other objects such as leak detection devices can be attached to the side of the formed trench. Such a system allows components (i.e., utilities) to be inserted into place inside the trench before the moldable forming composition is added and cured. The form of the invention, which is easily cut as noted herein, is then cut away in areas where the pipes or other objects must be accessed.

Embodiments of the present invention comprise a method of forming a drainage channel having a void with a predetermined shape using a moldable forming composition. The method comprises preparing a trench; providing a form body having first and second sides and a pair of lateral edges, the form body having a plurality of grooves extending from the first side into the form body toward the second side, the plurality of grooves being structured such that the form body may be configured into a non-planar shape corresponding to the predetermined configuration of the void; attaching a frame to the form body adjacent to the lateral edges of the form body, the frame being structured to support the form body; positioning the form body and frame in the trench; pouring a moldable forming composition in the trench about the form body; curing the moldable forming composition to form the drainage channel; and removing the form body.

In some embodiments, the method comprises providing a form body comprising a formable portion and a pair of lateral members. In some embodiments, the pair of lateral members are integrally formed. In some embodiments, the pair of lateral members are detachable. In some embodiments, the pair of lateral members are substantially rigid.

In some embodiments, the lateral members define a slot at least partially along the length of said form body and wherein said frame comprises a pair of elongate L-shaped members, each of said elongate L-shaped members being structured to engage a corresponding one of said slots in one of said pair of lateral members.

In some embodiments, the attaching step of the method comprises engaging an elongate L-shaped member into a corresponding slot in a lateral member of the form body.

In at least some embodiments, the form body of the invention is made of a lightweight material. In some embodiments, the form body of the invention is made of a buoyant material. If a form body made of buoyant material is not anchored or in some way secured in place, it will float up and out of place when the moldable forming composition is poured. Therefore, the form body must be anchored or secured in place before the moldable forming composition is added. In some embodiments, the pouring step of the method comprises pouring a first amount of moldable forming composition in the trench so as to cover the base of the frame; at least partially curing the first amount of moldable forming composition; and pouring a second amount of moldable forming composition in the trench about the form body.

In some embodiments, the form body is secured by "hanging" the form body in a void created in an already existing slab or other pre-existing structure. For example, a void such as a trench, a catch basin or a mechanical chase can be retrofitted into an already-existing slab. The slab may be present in its entirety, or may be partly formed. In some embodiments, the form can be attached directly to a heavy rebar using U-legs or vertical legs. In some embodiments, the form can be used to form a void without a frame, wherein the moldable forming composition is poured in multiple pours to enable keeping the form in place. One of ordinary skill in the art understands that there are many methods of securing the form body in place for the pouring of the moldable forming composition.

In some embodiments, the method further comprises inserting at least one spacer structured to provide support to the form body so as to maintain the form body in the non-planar shape. In some embodiments, one spacer is used. In some embodiments, a plurality of spacers are used. Spacers may be placed in any desired manner along the non-planar shape of the form body. In some embodiments, a plurality of spacers will be spaced at regular intervals along the length of the form body. One of ordinary skill in the art will recognize that the number of spacers used will depend at least in part on factors such as the length of the form body and the size of the void being formed.

In some embodiments, the method further comprises inserting at least one end cap member structure to be positioned at an end of the form body to prevent the moldable forming composition from entering the void and to provide support to the form body so as to maintain the form body in the non-planar shape.

In some embodiments, the method further comprises inserting a cover to be positioned at an end of the form body to prevent the moldable forming composition from entering the void and to provide support to the form body so as to maintain the form body in the non-planar shape. In some embodiments, at least one spacer and at least one end cap member are inserted into the form body prior to inserting the cover. In some embodiments, when the form body is attached to a frame assembly, the cover is secured to the frame so that the cover is kept in place during the forming process. The cover may assist in maintaining the placement of the spacer and the end cap member, and the entire assembly serves to stabilize the form against the weight of the moldable forming composition.

Embodiments of the present invention provide a form for forming an architectural feature of a predetermined configuration with a moldable forming composition. In at least some embodiments, the form comprises an adjustable form body having first and second sides, said form body configurable between a first position and a second position, the first position being substantially planar and the second position forming a non-planar shape corresponding to the predetermined configuration of the architectural feature shape. In some embodiments, the form body is made of an expanded polystyrene. In some embodiments, the form body further comprises a surface coating on at least one of the first and second sides. In some embodiments, the architectural feature is a curvilinear feature.

In some embodiments, the form comprises a form body comprising a lightweight material and/or buoyant material, such as expanded polystyrene, with a coating on at least one surface of the form body, wherein the form body is configured in a predetermined shape that results in creation of an architectural feature when a moldable forming composition is added.

All of the principles and characteristics discussed herein regarding a form body for forming a void of predetermined configuration in a moldable forming composition can be applied to the form for forming an architectural feature of a predetermined configuration with a moldable forming composition.

The form of the invention for forming an architectural feature of a predetermined configuration in a moldable forming composition offers a number of advantages. It can exist in a planar shape, making it easy to stack, package, ship, handle, and cut or otherwise reshape on the work site. It comprises less volume than a solid, pre-shaped form that could be used to form an architectural feature of the same dimensions, as the form of the invention is hollow when configured into the desired non-planar shape and, advantageously, may be placed in a planar configuration when shipping to conserve space. In addition, the form of the present invention can be shaped to any dimension desired, as the shapes and dimensions possible to be achieved with the form of the present invention are unlimited with respect to what might be desired for any specific use. A further advantage of the form of the present invention is the ease with which it is adjusted or resized on the work site. The form is easily manipulated and cut to meet on-site requirements as they arise.

The coating of the form body for forming an architectural feature comprises any of the surface coating materials discussed herein. In some embodiments, the surface coating is on the surface of the form body likely to be in contact with the moldable forming composition and is structured not to adhere to the moldable forming composition so that the form body is reusable.

In some embodiments, the surface coating is a film having an adhesive backing that will adhere to the adjustable form body and a relatively smooth outer surface that preferably has no or limited adherence to the moldable forming composition. In some embodiments, the film may comprise a metal (e.g., aluminum) and/or plastic (e.g., polypropylene or polyester), including metallized plastic. In other embodiments, the surface coating comprises a coating that is sprayed or brushed on, such as a polyeurea or a styrospray (e.g. styrospray 1000). In some embodiments, the coating or film comprises paper. In some embodiments, the paper is kraft paper.

In some embodiments, the surface coating is used to convey any desired texture to the surface of the architectural feature. In some embodiments, a smooth surface is desired. In other embodiments, a rough or textured surface is desired.

In some embodiments, the architectural feature is a linear feature. In some embodiments, the architectural feature is a curvilinear feature. The form of the invention is particularly advantageous in forming curvilinear features in addition to lateral edges. Examples of architectural features formed by the present invention include, but are not limited to, fountains, catch basins, mechanical chases, radius forming systems for creating features such as stages and auditorium structures, and columns (decorative and/or functional). Any construction or building feature can be formed by the invention, as the form of the invention can be flexed or bent to create the desired shape. Further, the form of the invention is easily adjusted at the job site by cutting, and is easily moved and positioned due to the lightweight materials used to make the forms. The material of the form is amenable to cuts of any shape, including wavy or curvilinear cuts, as well as linear cuts, further increasing the adaptability and usefulness of the forms of the present invention.

Embodiments of the present invention form architectural features including semi-spherical shapes (bowl-like), semi-circular (such as a curved stage), oval, square, rectangular, octagonal, pentagonal, sextagaonal, septagonal, etc. Other more fanciful shapes are possible, including stars and moons (at various moon phases), flowers, animals, etc. The invention is not limited by the particular shape that is predetermined.

In some embodiments, the form is structured to create a void of predetermined configuration for receiving the moldable forming composition. In such embodiments, the form is configured to receive the moldable forming composition in its interior.

In some embodiments, the form comprises form body segments including both a segment structured to create a void of predetermined configuration for receiving the moldable forming composition, and a solid segment structured to receive the moldable forming composition poured over the form. In some embodiments, the form comprises a planar form body wrapped or bent into a non-planar predetermined configuration around a solid form body.

In some embodiments, the form further comprises a support feature. In some embodiments, the support feature is selected from the group consisting of a metal support, a plastic support, a fiberglass support, an aluminum support, a cast iron support and a wooden support. In some embodiments, the support feature is selected from the group consisting of a metal grating and a rebar.

In some embodiments, the form further comprises a form body having first and second sides, said form body having a plurality of grooves extending from said first side into said form body toward said second side, said plurality of grooves being structured such that said form body may be configured into a non-planar shape corresponding to the predetermined configuration of the architectural feature.

As discussed hereinabove, a form body comprising a plurality of grooves is flexible and bendable, enabling the formation of an unlimited number of architectural feature shapes. In some embodiments, the form is bent or folded so that the first side of the form body is facing outward, placing the plurality of grooves on the outside surface of the form away from the moldable forming composition, and the inside surface, which is the second side of the form body, is an unbroken surface for receiving the moldable forming composition.

For example, a column can be formed by bending an elongate planar form body with a plurality of grooves to create a full circle or tube, wherein the plurality of grooves are on the first side of the elongate planar form body, away from the moldable forming composition, and the second side of the elongate planar form body is unbroken for receiving the moldable forming composition. The two ends of the elongate planar form bent into a circle or tube are held together by mechanical means or by an adhesive, such as an adhesive strip applied along the length of the edges where the two ends of the elongate planar form body meet.

Continuing with the present example of a column, at least the second side of the form body comprises a surface coating. The coating can be selected to create a column with a smooth surface or a column with a textured surface. The form circle can be further reinforced with a frame assembly and/or with support features, such as wood or metal supports.

In some embodiments, the form comprising a plurality of grooves is bent or folded so that the first side of the form body is facing inward, placing the plurality of grooves on the inside surface, facing the moldable forming composition, and the second side of the form body is facing outward and is an unbroken surface. Embodiments of the present invention in which the form body is bent so that the plurality of grooves is placed on the inside surface are well suited for creating columns of any shape, such as square or octagonal, in addition to circular.

For example, a column can be formed by bending an elongate planar form with grooves to create a full circle or tube shape, wherein form body is bent so that the first side of the form body is folded inward, placing the plurality of grooves inside the circle or tube, and the second side of the form body is facing outward and is unbroken. The two ends of the elongate planar form bent into a circle are held together by mechanical means or by an adhesive, such as an adhesive strip applied to the length of the edges where the two ends meet.

At least one side of the form body of the elongate planar form bent into a circle comprises a surface coating. The coating can be selected to create a column with a smooth surface or a column with a textured surface. The form circle can be further reinforced with a frame assembly and/or with support features, such as wood or metal supports.

Embodiments of forms of the present invention for forming architectural features comprise an adjustable form body having first and second sides, said form body configurable between a first substantially planar position and a second non-planar position. In some embodiments, cutouts may be added to the form body to enable or enhance specific folding or bending of the form body.

In one embodiment, the architectural feature is a catch basin. See, for example, FIGS. 8A-8E. The predetermined configuration of the catch basin is achieved by cutting and bending, or flexing, the form body. In one example, a form for forming a square or rectangular catch basin is created by cutting three "V" notches in a single planar sheet of form body material, such as expanded polystyrene (EPS). The V notches provide space for creating of the corners of the catch basin when the planar sheet of form body material is folded into a square or rectangle. One of ordinary skill in the art recognizes that any shape can be made and still falls within the scope of the present invention.

The folded square or rectangular form body sheet is attached to a bottom sheet made of the same form body material. In some embodiments, the folded square or rectangular form body sheet is also attached to a top sheet. The top sheet can be made of the same material as the form body. In one example a fold square form body sheet attached to a bottom sheet and a top sheet creates a form that is cube-shaped.

The form for forming a catch basin is reinforced with a frame assembly, or brace system, which can comprise any type of frame or brace. In some embodiments, conventional braces, like wood, plastic or metal, are used. One of ordinary skill in the art recognizes that any type of frame system can be used with the form of the invention and still fall within the scope of the invention. The square or rectangular form body is used much like the form for forming a void, or trench, described above, wherein the moldable forming composition is poured around the outside of the square or rectangular form body, thus creating the catch basin.

Embodiments of the present invention provide components of a heating, ventilation and air conditioning (HVAC) system. The principles and characteristics discussed herein regarding a form body for forming a void or architectural feature of predetermined configuration in a moldable forming composition can be applied to the form for forming a component of a predetermined configuration for use in an HVAC system.

In some embodiments the invention provides a form for forming a component of a predetermined configuration for an HVAC system comprising a form body having first and second sides, said form body having a plurality of grooves extending from said first side into said form body toward said second side, said plurality of grooves being structured such that said form body may be configured into a non-planar shape corresponding to the predetermined configuration of the HVAC component.

In some embodiments the invention provides form for forming a component of a predetermined configuration for an HVAC system, comprising an adjustable form body having first and second sides, said form body having a plurality of grooves extending from said first side into said form body toward said second side, said plurality of grooves being structured such that said form body may be configured between a first position and a second position, the first position being substantially planar and the second position forming a non-planar shape corresponding to the predetermined configuration of the HVAC component.

In some embodiments, the form body is made of a lightweight, buoyant material. In some embodiments, the form body is made of an expanded polystyrene (EPS).

In some embodiments, the spacing between each of said plurality of grooves is approximately equal. In some embodiments, the spacing between said plurality of grooves varies. In some embodiments, the plurality of grooves are parallel.

In some embodiments, at least one of said plurality of grooves has a tapered configuration. In some embodiments, at least one of said plurality of grooves is tapered from the first side toward the second side.

In some embodiments, the form further comprises a surface coating on at least one of said first and second sides. In some embodiments, the surface coating conveys a texture to the surface on which is it placed. In some embodiments, the texture conveyed to the surface by the surface coating is a substantially smooth texture. In some embodiments, the texture conveyed to the surface by the surface coating is a substantially rough texture.

In some embodiments, the predetermined configuration is tubular or pipe-shaped. In some embodiments, the form body is shaped so that the first side with the plurality of grooves extending from said first side is facing outward, away from the void through which the HVAC air flow occurs, and the second side faces inward, toward the void created inside the tube or pipe wherein the air of the HVAC system will flow. Such a configuration provides an unbroken surface on the interior of the tube or pipe.

In some embodiments, the predetermined configuration is maintained by mechanical means or by an adhesive, such as an adhesive strip applied along the length of the edges where the two ends of the elongate planar form body meet. In some embodiments, the predetermined configuration is maintained by using a permanently flexible adhesive.

Thus, the forms of the present invention are advantageous for use as components, such as tubing or piping, in HVAC systems. For example, using EPS forms to create components of an HVAC system provides a lightweight material that already has insulating properties. The forms of the invention enable creation of HVAC tubing with a smooth air flow surface, which provides protection against mold growth, which is often a problem with HVAC components. The HVAC components of the invention are created as described hereinabove, with the forms created from a planar sheet bent into a predetermined configuration, such as a circular or tubular shape. A permanently flexible adhesive, such as duct tape, is used to connect the components together.

Forms of the present invention to be used in HVAC components are coated with a film or surface coating. In some embodiments, the film has thermal and insulating properties. In some embodiments, the film is metallized polypropylene. In some embodiments, the film is polyester. In one example, the HVAC tubing comprises a 1.5 ml coating of polyester on the interior (the side through which the air flows) and a 5.0 ml coating of polyester on the exterior. Any surface coating described herein can be used in the forms of the invention to be used in HVAC components.

The forms of the present invention are further useful for creating reusable packaging, due to the flexibility and adaptability of the forms. For example, a packaging container for shipping wine bottles could easily be custom-fit to the shape of the wine bottle. A packaging container can be created for any purpose from the forms of the invention. For example, a form can be cut and folded to precisely fit the dimensions of expensive machinery parts.

FIG. 1A shows a perspective illustration of a form for forming a void of predetermined configuration in a moldable forming composition according to example embodiments of the invention. The form body 10 comprises a first side 12 and a second side 14. The form body has a plurality of grooves 16 extending from said first side 12 into the form body 10 toward the second side 14. The plurality of grooves is structured such that the form body 10 can be configured into a non-planar shape corresponding to the predetermined configuration of the void. The slots 40 serve to attach the form body to a frame. The cover 50 prevents the moldable forming composition from entering the void and stabilizes the form body so that the form body will not waver, twist, distort or move when the moldable forming composition is added.

As shown in FIG. 1A, the form body comprises a formable portion and two lateral members. The formable portion, which is the lower section of the form body 10 as shown in FIG. 1A comprising the grooves 16, and the lateral member, which is the upper section of the form body 10 as shown in FIG. 1A, meet at 13. As shown in FIG. 1A, the pair of lateral members are substantially parallel to one another. In some embodiments, the formable portion and the two lateral members are one component, or integrally formed. In other embodiments, the two lateral members and the formable member are separate detachable components and are joined together in the form assembly. In still other embodiments, the two lateral members are not parallel to one another.

As can be seen in FIG. 1A, the spacing 18 between the plurality of grooves 16 is approximately equal and the grooves 16 are parallel to one another. The form body 10 is shown configured into a non-planar shape. The plurality of grooves 16 have a tapered configuration, which is particularly easy to see when the form body 10 is in a planar position as shown in FIG. 1B. The tapered plurality of grooves enables the form body to bend and flex.

FIG. 1B shows the tapered configuration of the grooves 16, tapering from the first side 12 into the form body 10 toward the second side 14. This leaves room at the end of the grooves 16 nearest the first side 12 for the spacing 18 between the grooves to be brought closer together by bending or flexing the form body 10 while maintaining the integrity of the second side wall 14 for use in the molding process. The slots 40, which serve to attach the form body 10 to a frame, can also be seen in FIG. 1B. One of skill in the art would understand that the dimensions and tapering of the plurality of grooves 16 and the spacing 18 between the grooves can be varied and still fall within the scope of the invention.

FIG. 2 illustrates an end view of a form for forming a void of predetermined configuration in a moldable forming composition according to example embodiments of the present invention. The first side 12 and second side 14 can be clearly seen by viewing the end of the form body 10. The first side 12 is the side facing the void and facing away from where the moldable forming composition will be poured. The second side 14 is the side that comes into contact with the moldable forming composition when the void is being formed. As can be seen in FIG. 2, the second side 12 forms opposed side surfaces 12(*a*) and 12(*b*). Each of opposed side surfaces 12(*a*) and 12(*b*) faces the other opposed side surface. Defined between the opposed side surfaces is the void 20. The void 20 will reach its full final dimensions when the form body is removed from the cured moldable forming composition, wherein the second side of the form body will define the inner surface of the void.

In at least some embodiments, such as the ones shown in FIGS. 1A, 1B, and 2, the plurality of grooves 16 create gaps between the spacings 18 that are visible when the form body is in a planar configuration as shown in FIG. 1B. The grooves 16 begin to close as the form body is configured into a non-planar shape as shown in FIGS. 1A and 2. The non-planar shape of the form body as illustrated in FIGS. 1A and 2 is a U-shaped configuration. The U-shaped configuration comprises a curved "U" bottom and two substantially straight opposing sides. In the present example, the curved bottom is achieved by bending the form body along the elongate parallel grooves 16. The adjustability of the form body is such that it can be configured from a planar shape into any non-planar shape, with a round or straight bottom, up to the point where the grooves 16 no longer create gaps between the spacings 18 and adjacent spacings 18 are making contact with each other.

Any of the embodiments shown herein may have a surface coating, on at least one surface of the form body or the form body components. For example, looking at FIG. 2, there may be a surface coating on side 14 of the form body.

Figure 6:
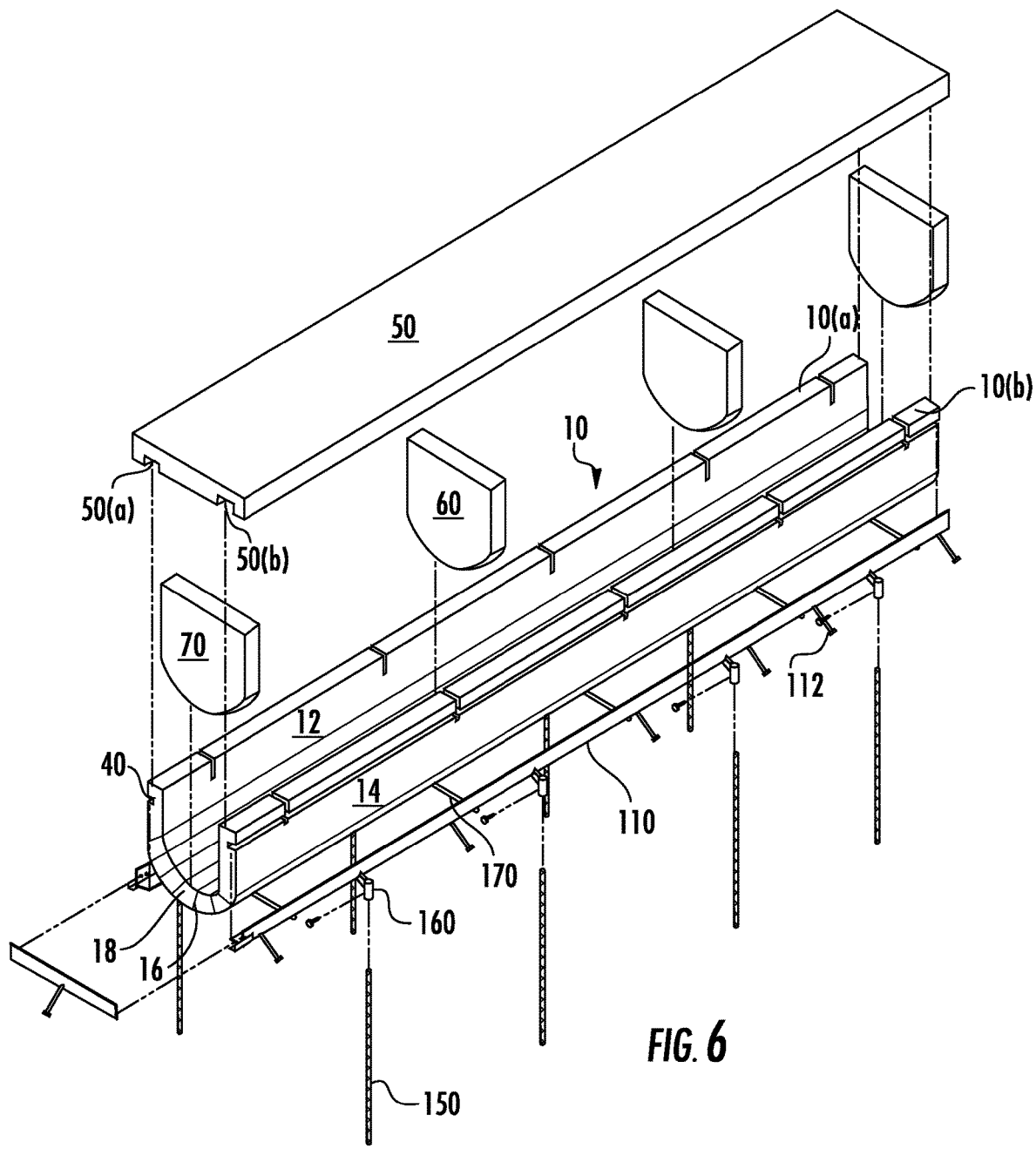
FIG. 6 is an exploded-perspective view illustrating a form for forming a void of predetermined configuration in a moldable forming composition, according to one embodiment of the present invention.

Side 14 is the side that comes into contact with the moldable forming composition. Side 12 may be covered with the surface coating as well, as might any surface of the cover 50. As seen in FIGS. 4 and 6, any surface of the end cap members 70 or the spacers 60 may be coated with a surface coating.

FIG. 3 illustrates a top cutaway view of a form for forming a void of predetermined configuration in a moldable forming composition according to example embodiments of the present invention. FIG. 3 shows two elongate form bodies 10(1) and 10(2) positioned so that an end of one form body is attached to an end of an adjacent form body 30. Such an arrangement enables the creation of a void of a longer length than what would be achievable with a single form body. This feature, like others listed herein, contributes to the efficiency of use of the form body of the invention, as a finite number of form body sizes can be manufactured and the length can be functionally extended by attaching multiple form bodies end to end. A mechanical means, such as an alignment block, can be used for joining the two form bodies together.

Still referring to FIG. 3, the end cap members 70 along with the cover (not shown) serve to stabilize the form to maintain the desired configuration of the form. The spacers 60 further help to maintain the desired configuration of the form. The combination of the end cap members, the spacers, and the cover help to keep the form from wavering, twisting or distorting when the moldable forming composition is added to the form. Also see FIGS. 4-7 for other views of how the end cap members 70, the spacers 60 and the cover 50 function to stabilize the form.

FIG. 4 shows an exploded perspective of a form for forming a void of predetermined configuration in a moldable forming composition according to example embodiments of the present invention. Comparing FIG. 4 to FIG. 1A, there is illustrated the form body 10, the first side 12, the second side 14, the grooves 16, the spacing 18 between the grooves, the slots 40 and the cover 50.

The form body 10 in FIG. 4 is shown positioned in a frame assembly as is used to form a void. As can clearly be seen in FIG. 4, the form body comprises a cover 50, spanning the length of the elongate form body 10. The form body 10 further comprises spacers 60 and end cap members 70.

The cover 50, the spacers 60 and the end cap members 70 help to stabilize the form body in the frame and keep the moldable forming composition from leaking into the form body. The cover 50 fits snugly over the two upward edges of the form body 10(a) and 10(b) at notches 50(a) and 50(b). Notches 50(a) and 50(b) run the length of the cover. As can be seen particularly well in FIG. 5, the end cap member 70 fits into the void 20 of the form body 10 to assist in stabilizing the predetermined configuration. Looking again at FIG. 4, the end cap members 70 and spacers 60 fit down into the void 20 created by the shaped form body 10 in a recessed way, leaving space for the underside of the cover 50 to fit down into the void, as the notches 50(a) and 50(b) of the cover 50 receive the two edges of the form body 10(a) and 10(b). As can be seen via the dotted lines in FIG. 4, the end cap members 70 fit into the void 20 at the ends of the void 20 so that the end cap members 70 are in a planar fashion, or flush, with the end of the elongate form body 10.

Figure 5:
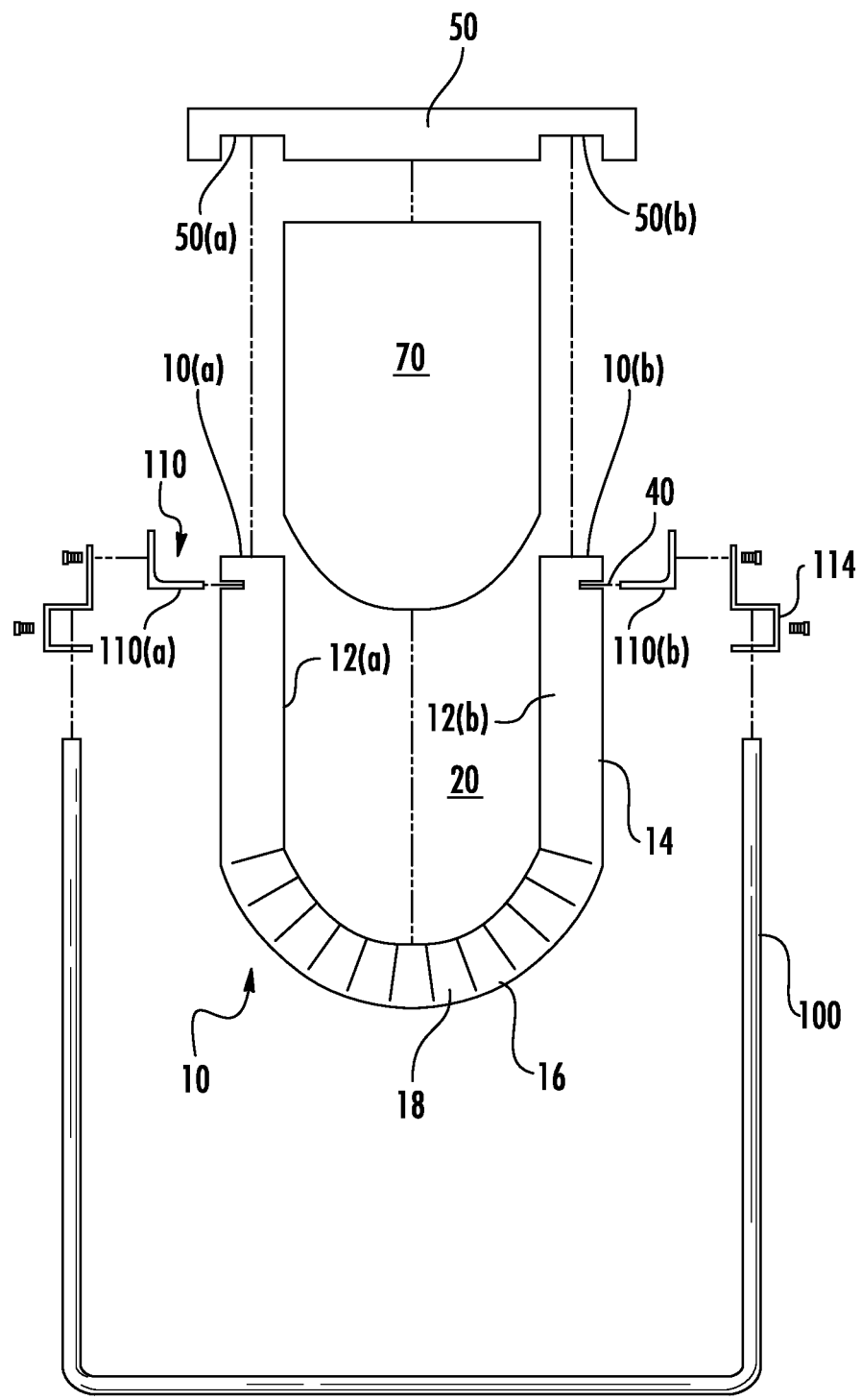
FIG. 5 is an exploded-end view illustrating a form for forming a void of predetermined configuration in a moldable forming composition, according to one embodiment of the present invention.

FIGS. 4 and 5 show a frame or support system as used in one embodiment of the invention. The support system includes U-legs 100 that anchor the form body 10, elongate L-shaped frame members 110 with studs 112, and fasteners, such as brackets 114, to fasten the components of the form body system together. The elongate L-shaped frame members 110 fit into notches 40 at 110(a) and 110(b) when the components of the form body system are assembled.

In at least some embodiments, the elongate L-shaped frame members 110 serve not only to support the form body 10 during formation of the void of predetermined configuration, but also act as a support for a grate or other covering for the finished void of predetermined configuration. Thus, the elongate L-shaped frame members 110 with studs 112 receive a grate or cover for the void, or trench, after the moldable forming composition has cured. Looking at FIGS. 4 and 5, the "L" of the elongate L-shaped members 110 (110(a) and 110(b) in FIG. 5) are shaped to receive a flat grate or cover that spans from one of the pair of elongate L-shaped members to the other of the pair of elongate L-shaped members, thereby covering the entire width of the void or trench created by the form.

In some embodiments, the elongate L-shaped frame members 110 are removed after the moldable forming composition has cured. In such embodiments, and in contrast to the embodiments shown in FIGS. 4-7, the elongate L-shaped frame members 110 lack the studs 112, making it easy to slide the elongate L-shaped frame members out of the frame assembly after the moldable forming composition has cured. Embodiments lacking the studs 112 are useful in situations wherein the cover of the void is not required to bear large weight loads, and the elongate L-shaped frame members 110 can be removed and reused.

Still referring to FIG. 4, the lifted cover 70 of the form body 10 allows visibility of the spacers 60. Two of the U-shaped spacers 60 can be seen inserted into the void 20 of the form body 10 (also see FIGS. 2 and 5). Two end cap members 70 are also illustrated. One end cap member 70 can be seen at the far left end of the elongate form body 10 and one end cap member 70 can be seen at the far right end of the elongate form body 10 as shown in FIG. 4. The end cap members 70 are U-shaped and each is co-planar with a set of U-legs 100 as shown in the embodiment in FIG. 4. The two U-shaped spacers 60 and the two end cap members 70 are positioned such that the edges along the "U" curve of the each spacer 60 and end cap member 70 are in contact with the side of the form body at 12 in order to assist in maintaining the predetermined configuration during the process of forming the void.

As illustrated in FIGS. 4 and 5, the vertical ends of the U-legs 100 connect to the pair of elongate L-shaped frame members 110 via fasteners, including the brackets 114. In some embodiments, a pin is positioned across the cover from one L-shaped member 110 to the other to hold the cover in place in the finally assembled form. The form body 10 is secured to the frame by slots 40 in the form body that correspond to and receive the elongate L-shaped frame members 110. The elongate L-shaped frame members 110 have a plurality of studs 112 that secure the elongate L-shaped frame members 110 in the moldable forming composition.

Figure 7:
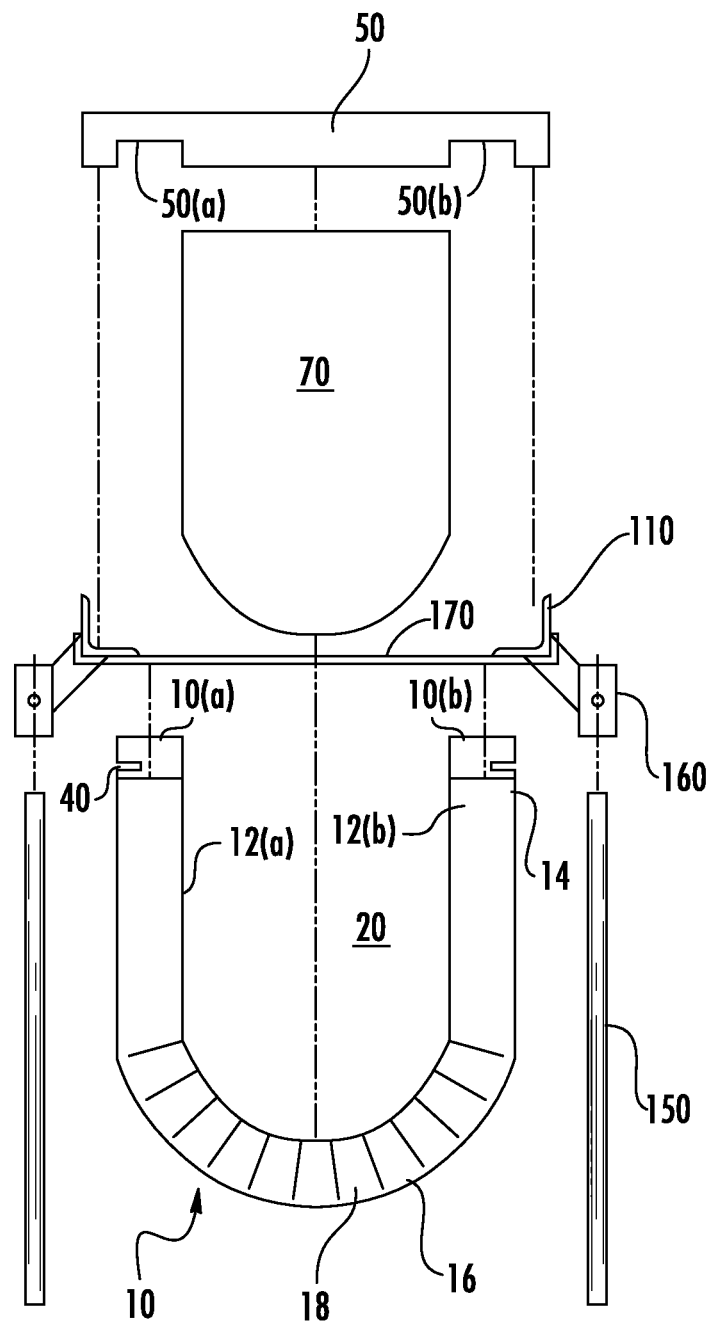
FIG. 7 is an exploded-end view illustrating a form for forming a void of predetermined configuration in a moldable forming composition, according to one embodiment of the present invention.

FIG. 5 shows an exploded end view of a form for forming a void of predetermined configuration in a moldable forming composition according to exemplary embodiments of the present invention. FIG. 5 illustrates an end cap member 70 of the invention, as well as a cover 50. Like FIG. 4, the forms of FIGS. 5-7 are shown positioned in a frame assembly as they would be used in some embodiments to form a void such as a trench.

FIG. 5 illustrates the plurality of grooves 16 and the spacing between the grooves 18 in the form body 10, as well as the void 20 formed between the opposing side walls 12(a)

and 12(b) of the form body 10. As can be seen in FIG. 5, the plurality of grooves are in a tapered format, allowing for bending of the form body into the U-shaped configuration.

FIG. 6 shows an exploded perspective of a form for forming a void of predetermined configuration in a moldable forming composition according to example embodiments of the present invention. Comparing FIG. 6 to FIG. 1A, there is illustrated the form body 10, the first side 12, the second side 14, the grooves 16, the spacing 18 between the grooves, the slots 40 and the cover 50.

The form body 10 in FIG. 6 is shown positioned in a frame assembly as is used to form a void, such as a trench. As can clearly be seen in FIG. 6, the form body 10 comprises a cover 50, spanning the length of the elongate form body 10. The form body 10 further comprises spacers 60 and end cap members 70.

As is seen in FIGS. 6 and 7, the cover 50, the spacers 60 and the end cap members 70 help to stabilize the form body 10 in the frame and keep the moldable forming composition from leaking into the interior void 20 of the form body 10. The cover 50 fits snugly over the two edges of the form body 10(a) and 10(b) at notches 50(a) and 50(b). As can be seen particularly well in FIG. 7, the end cap member 70 fits into the void 20 of the form body 10 to assist in maintaining the predetermined configuration during the process of adding the moldable forming composition. The end cap members 70 and spacers 60 fit in a recessed way in the void 20 created by the shaped form body 10, leaving space for the underside of the cover 50 to fit down into the void 20, as the notches 50(a) and 50(b) of the cover 50 receive the two edges of the form body 10(a) and 10(b).

FIGS. 6 and 7 show a form with frame or support system as used in one embodiment of the invention. The support system includes vertical legs 150 that anchor the form body 10, elongate L-shaped frame members 110 with studs 112, and fasteners 160 to fasten the components of the form body system together. In at least some embodiments, the elongate L-shaped frame members 110 serve not only to support the form body 10 during formation of the void of predetermined configuration, but also act as a support to receive a grate or other covering for the finished void of predetermined configuration.

Still referring to FIG. 6, the view of the uncovered form body allows visibility of spacers 60. Two of the U-shaped spacers 60 can be seen inserted into the void 20 of the form body 10 (also see FIGS. 2 and 5). Two end cap members 70 are also illustrated. One end cap member 70 can be seen at the far left end of the elongate form body 10 as shown in FIG. 6 and one end cap member 70 can be seen at the far right end of the elongate form body 10 as shown in FIG. 6. The end cap members 70 are U-shaped and each is coplanar, or flush, with the end of the elongate form body 10 as shown in the embodiment in FIG. 6.

As illustrated in FIG. 6, the vertical legs 150 connect to the pair of elongate L-shaped frame members 110 via fasteners 160. As can be seen in FIGS. 6 and 7, there are support bars, or crossbars, 170 that connect the pair of elongate L-shaped frame members 110 to each other, and that occur periodically along the length of the form body 10. The vertical legs 150 are positioned along the elongate L-shaped frame members 110 so that their position does not coincide with the position of a crossbar 170. In other words, the vertical legs 150 and the crossbars 170 are staggered along the length of the elongate L-shaped frame members 110.

In some embodiments, a pin is positioned across the cover from one elongate L-shaped member 110 to the other to hold the cover in place in the final assembled form. The form body 10 is secured to the frame by slots 40 in the form body 10 that correspond to and receive the elongate L-shaped frame members 110. The elongate L-shaped frame members 110 have a plurality of studs 112 that secure the elongate L-shaped frame members 110 in the moldable forming composition.

FIG. 7 shows an exploded end view of a form for forming a void of predetermined configuration in a moldable forming composition according to exemplary embodiments of the present invention. FIG. 7 illustrates an end cap member 70 of the invention, as well as a cover 50.

FIG. 7 illustrates the plurality of grooves 16 and the spacing between the grooves 18 in the form body 10, as well as the void 20 formed between the opposing side walls 12(a) and 12(b) of the form body 10. As can be seen in FIG. 7, the plurality of grooves are in a tapered format, allowing for bending of the form body 10 into the U-shaped configuration.

Other embodiments of a form of the present invention with a frame or support system include the following. In one example, the frame or support system lacks legs, including the U-legs 100 of FIGS. 4 and 5, and the vertical legs 150 of FIGS. 6 and 7. A system lacking legs could be used, for example, in a retrofitting project or for forming a mechanical chase. In another example, the frame or support system lacks the elongate L-shaped frame members 110 shown in FIGS. 4-7. In still other examples, the elongate L-shaped frame members 110 are included in the frame assembly but are structured to be easily removed once the moldable forming composition has cured. One of ordinary skill in the art recognizes that other frame or support systems are possible and would fall within the scope of the invention.

FIGS. 8A-8C show a form of the invention as used for forming an architectural feature of a predetermined configuration in a moldable forming composition according to exemplary embodiments of the present invention. FIG. 8A illustrates a planar form body 100 of the invention to be shaped as a form for forming a catch basin. The planar sheet from which the form body is made comprises a first side 110 and a second side 112. As can be seen in FIG. 8A, the planar sheet of the unbent form body comprises three V-shaped notches 114 cut in the first side 110 of the form. The notches 114 enable the form body 100 to be folded so that a corner is created at the location of each V-shaped notch 114. The end edges 116 of the form body 100 are beveled so that when the form body is folded or bent, the edges 116 come together to form the fourth corner of the square or rectangular shape. The planar form body 100 is folded into a non-planar shape for use in forming an architectural feature. The planar form body 100 of FIG. 8A is made to create a square or rectangle when folded.

The form of FIGS. 8A-8C is used for forming an architectural feature of a predetermined configuration in a moldable forming composition. In the embodiment shown in FIGS. 8A-8C, the architectural feature is a catch basin. The catch basin, similar to the description herein of the form for forming a void such as a trench, must be able to withstand the load applied by the moldable forming composition, which will be applied to the outside of the form. FIG. 8B shows spacers 120 and 122 that are used to reinforce the catch basin form body 100. As can be seen in FIG. 8C, the spacers 120 and 122 are placed inside of the folded form body 100 so that they are in contact with side 110 and are in contact with and perpendicular to each other.

The form body 100 is folded into its final predetermined configuration as illustrated in FIG. 8C. The three V-shaped notches 114 become corners of the non-planar form. The beveled edges 116 create the fourth corner. Spacers 120 and 122 are placed in the non-planar form body 100 as shown in FIG. 8C, fitting across one another to provide strength and stabilization to the form body 100.

Figure 8D:
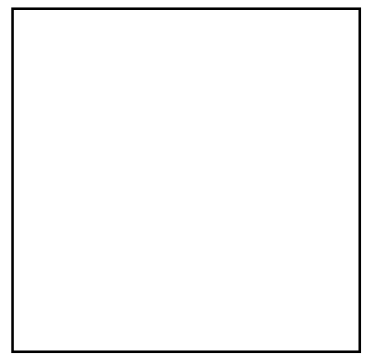
Figure 8E:
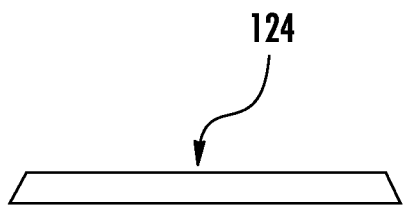

The form body 100 in its final predetermined configuration is fitted with a flat top and a flat bottom. The top 124 and bottom 124 of the catch basin form are the same as each other in the embodiment shown in FIG. 8D and FIG. 8E, and are shown in FIG. 8D as they would look from directly above or below, and in FIG. 8E from the side. The top and bottom 124 serve to stabilize the form and to keep the moldable forming composition out of the interior spaces (such as side 110) of the form.

The outer surface 112 is coated with a surface coating. The surface coating minimizes adherence of the moldable forming composition to the form, allowing for easier removal of the form after the moldable forming composition has cured. The surface coating makes it possible to reuse the form body. The top and bottom 124 may also be coated on at least one side with a surface coating.

The surface coating can also contribute to creating a desired surface texture for the final product formed in the moldable forming composition. For example, in the present embodiment, it may be desirable for the catch basin to have a smooth surface for liquid to pass over, maximizing flow velocity and minimizing debris capture.

The catch basin form of FIGS. 8A-8E is supported by a frame assembly as is known by one of ordinary skill in the art.

Figure 9A:
FIG. 9A is a perspective view illustrating a form for forming an architectural feature of predetermined configuration in a moldable forming composition, according to one embodiment of the present invention.
Figure 9B:
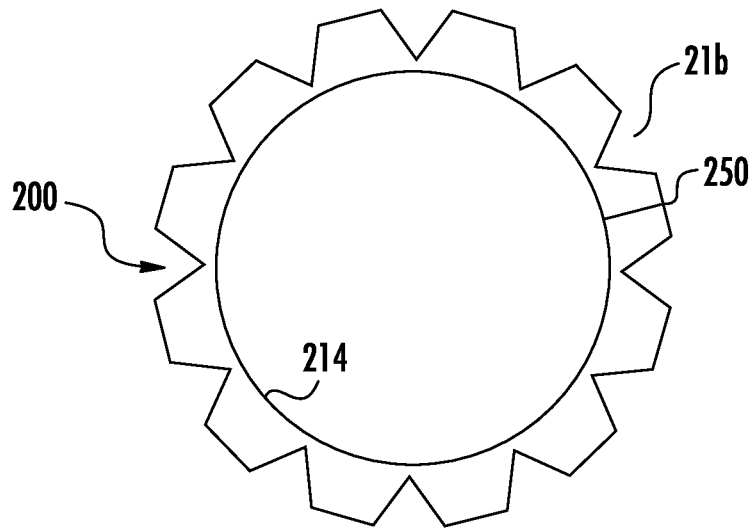
FIG. 9B is an end view illustrating a form for forming an architectural feature of predetermined configuration in a moldable forming composition, according to one embodiment of the present invention.

FIGS. 9A and 9B show a perspective view and an end view, respectively, of a form of the invention as used for forming an architectural feature of a predetermined configuration in a moldable forming composition according to exemplary embodiments of the present invention. A column can be formed by bending an elongate planar form body 200 with a plurality of grooves 216 to create a full circle or tube, wherein the plurality of grooves 216 are on the first side of the elongate planar form body 200, away from where the moldable forming composition will be placed, and the second side 214 of the elongate planar form body 200 is unbroken for receiving the moldable forming composition. The two ends of the elongate planar form body 200 bent into a circle or tube meet at seam 250 and are held together by mechanical means or by an adhesive, such as an adhesive strip applied along the length of the edges where the two ends of the elongate planar form body meet.

In some embodiments, at least the second side 214 of the form body comprises a surface coating. The coating can be selected to create a column with a smooth surface or a column with a textured surface. The form body 200 can be further reinforced with a frame assembly and/or with support features, such as wood or metal supports.

Figure 10A:
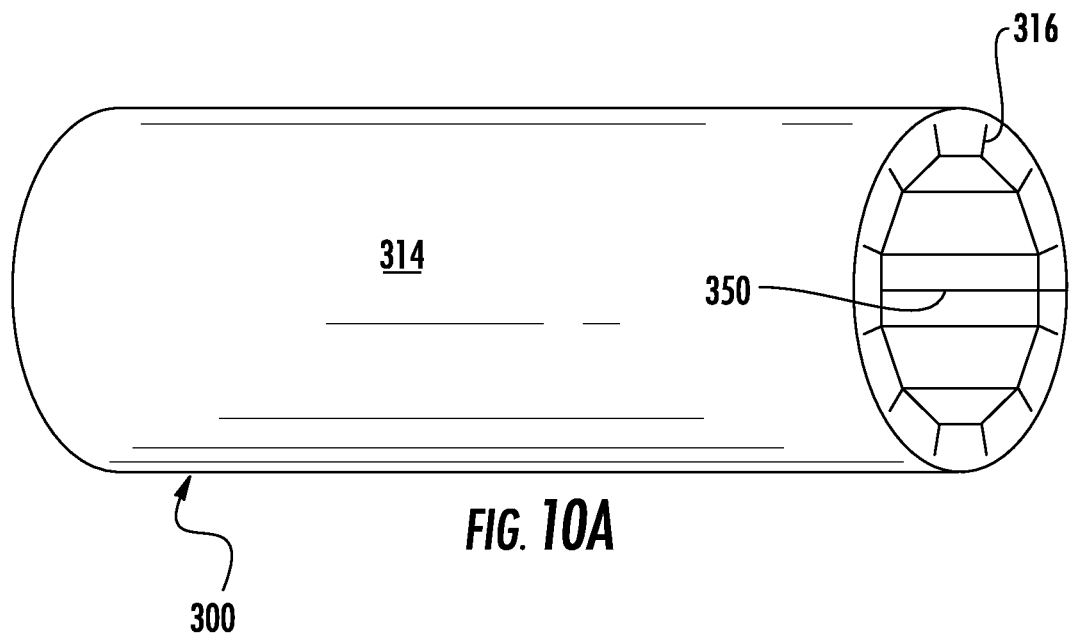
FIG. 10A is a perspective view illustrating a form for forming an architectural feature of predetermined configuration in a moldable forming composition, according to one embodiment of the present invention.
Figure 10B:
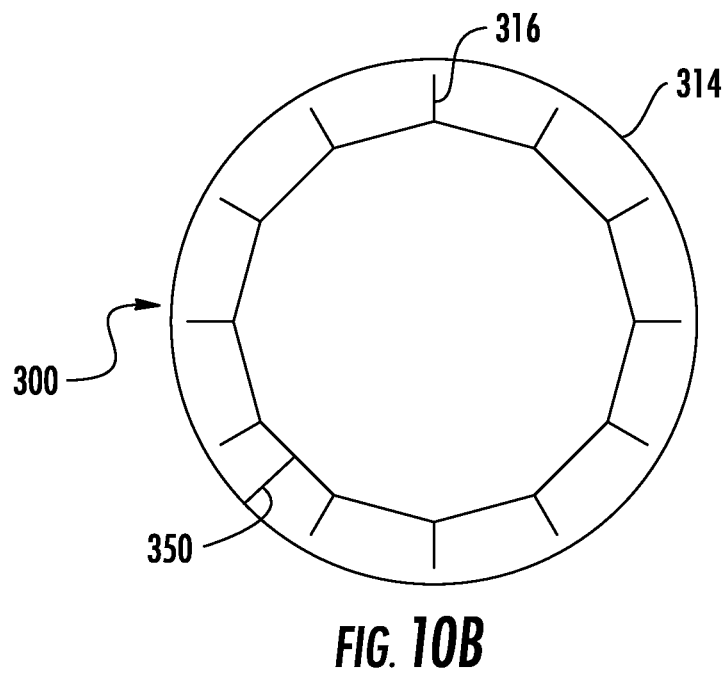
FIG. 10B is an end view illustrating a form for forming an architectural feature of predetermined configuration in a moldable forming composition, according to one embodiment of the present invention.

FIGS. 10A and 10B show a perspective view and an end view, respectively, of a form of the invention as used for forming an architectural feature of a predetermined configuration in a moldable forming composition according to exemplary embodiments of the present invention. A column can be formed by bending an elongate planar form body 300 with a plurality of grooves 316 to create a full circle or tube shape, wherein the form body 300 is bent so that the first side of the form body 300 is folded inward, placing the plurality of grooves 316 inside the circle or tube, and the second side 314 of the form body is facing outward and is unbroken. The two ends of the elongate planar form bent into a circle meet at seam 350 and are held together by mechanical means or by an adhesive, such as an adhesive strip applied to the length of the edges where the two ends meet.

At least one side of the form body of the elongate planar form body 300 bent into a circle comprises a surface coating. The coating can be selected to create a column with a smooth surface or a column with a textured surface. The form body 300 can be further reinforced with a frame assembly and/or with support features, such as wood or metal supports.

Figure 11:
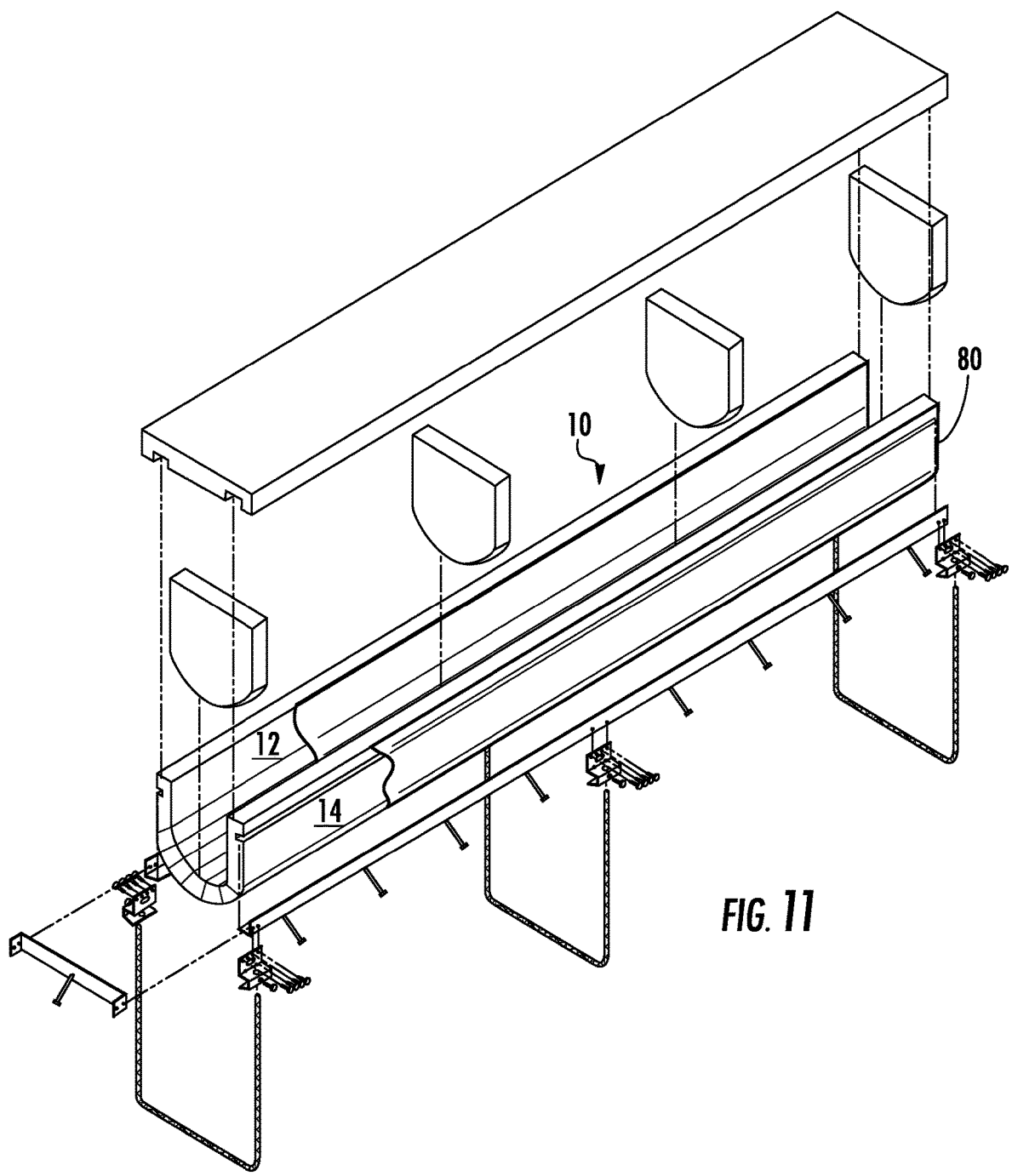
FIG. 11 is an exploded-perspective view illustrating a form for forming a void of predetermined configuration in a moldable forming composition, according to one embodiment of the present invention

FIG. 11 is similar to the exploded perspective of a form for forming a void of predetermined configuration in a moldable forming composition according to example embodiments of the present invention as shown in FIG. 4, including the form body 10, the first side 12, and the second side 14. Notably, the first side 12 and the second side 14 of the form body 10 as shown in FIG. 11 are coated with a surface coating 80. The surface coating 80 is illustrated in black, and is cut away at the left side of FIG. 11 to show the expanded polystyrene of the form body beneath the surface coating 80. The cut away view is for purposes of illustration only, as sides 12 and 14 would be fully covered by the surface coating 80 during use.

Figure 12:
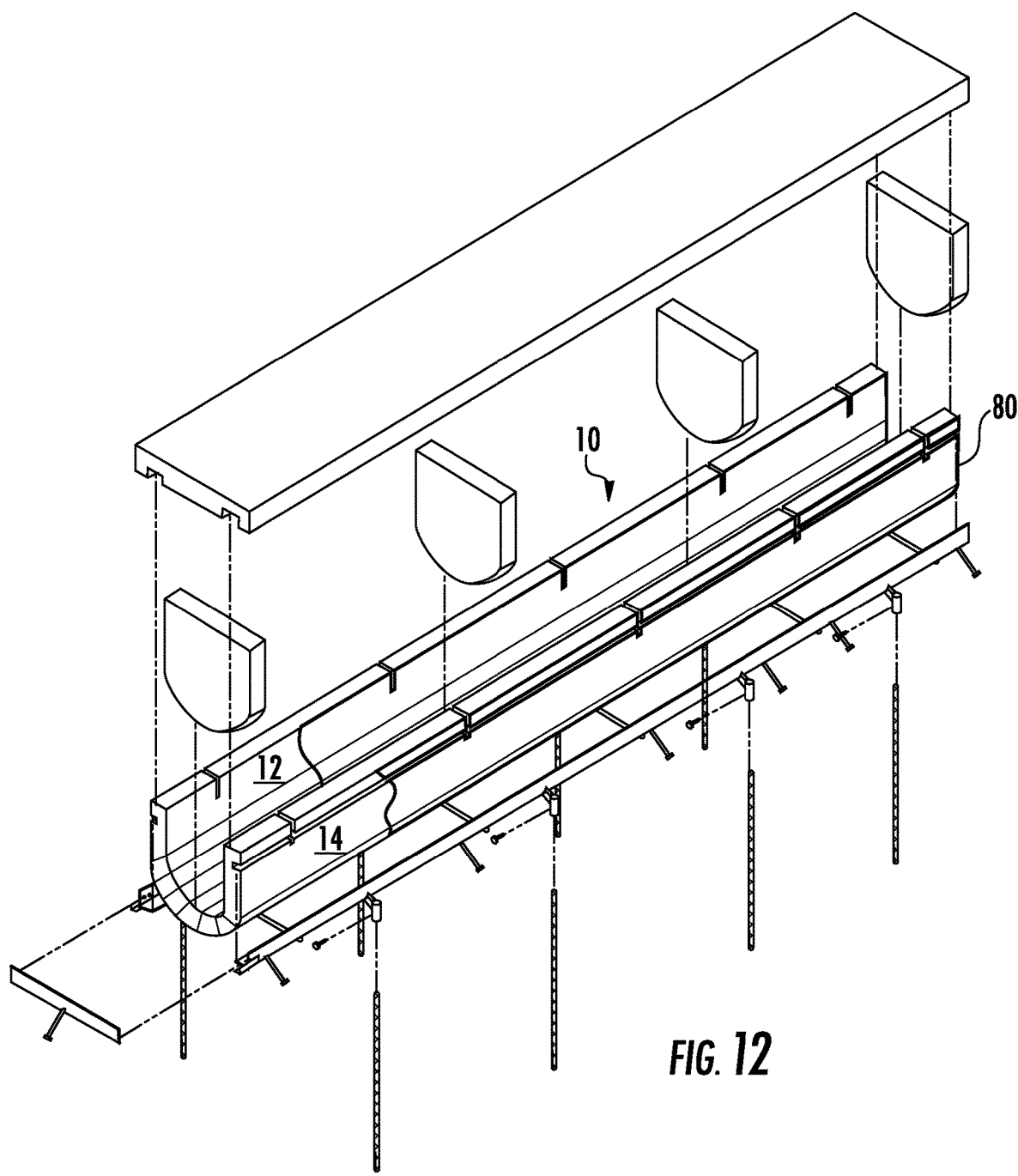
FIG. 12 is an exploded perspective view illustrating a form for forming a void of predetermined configuration in a moldable forming composition; according to one embodiment of the present invention.

FIG. 12 is similar to the exploded perspective of a form for forming a void of predetermined configuration in a moldable forming composition according to example embodiments of the present invention as shown in FIG. 6, including the form body 10, the first side 12, and the second side 14. Notably, the first side 12 and the second side 14 of the form body 10 as shown in FIG. 12 are coated with a surface coating 80. The surface coating 80 is illustrated in black, and is cut away at the left side of FIG. 12 to show the expanded polystyrene of the form body beneath the surface coating 80. The cut away view is for purposes of illustration only, as sides 12 and 14 would be fully covered by the surface coating 80 during use.

The particular physical appearances of the form bodies included are examples only. Numerous types of form bodies can be created using embodiment of the invention, along with various types of assemblies and frames.

A form body according to example embodiments of the invention can vary in size, shape and thickness. The form body can be sized and shaped in accordance with the profile of the assembly, the size and specifications desired, as well as manufacturing and shipping considerations. In some of the embodiments disclosed here, the form is configured into a U-shape and sized to work with the dimensions of a standard assembly frame such as those shown in FIGS. 4-7 and such as those described in U.S. Pat. Nos. 5,281,051 and 5,399,047, the contents of which are incorporated herein by reference.

In some of the embodiments disclose herein, the form body is configured into a cube or square shape sized to work with the dimensions of a standard drainage system in providing a catch basin. In still other embodiments disclosed herein, the form body is configured into a decorative column to be used as desired in a stylistic design.

The form bodies of FIGS. 1-12 are examples only, and a form body according to an embodiment of the invention can be made in various ways, not limited to particular shapes, sizes or dimensions.

The various portions of the form according to example embodiments of the invention can be made of any of various materials. The form body, end cap member, cover, and spacer can be made of metal, wood, fiberglass or plastic, as can the various portions of the assembly frame for the components of the form. The form body, end cap member, cover or spacer can be made of a buoyant material. In some embodiments, the buoyant material is a formed plastic body. In some embodiments, the buoyant material is expanded polystyrene. In some embodiments, the end cap member, cover, or spacer can be made of masonite or an equivalent or can be made of fiberboard laminated to expanded polystyrene. One of skill in the art recognizes that there are numerous materials that can be used in the forms of the invention.

The materials of the form further include a surface coating according to some example embodiments of the invention. In some embodiments, the surface coating is applied to at least one of the first and second sides of the form body. Referring to FIGS. 1-7, in some embodiments, the surface coating is applied to the first side 12. In some embodiments, the surface coating is applied to the second side 14. In some embodiments, the surface coating is applied to both of first side 12 and second side 14. Referring to FIG. 8, in some embodiments, the surface coating is applied to the first side 110. In some embodiments, the surface coating is applied to the second side 112. In some embodiments, the surface coating is applied to both of first side 110 and second side 112. Referring to FIG. 9, in some embodiments, the surface coating is applied to the second side 214. Referring to FIG. 10, in some embodiments, the surface coating is applied to the second side 314. The surface coating can also be added to any surface of the end cap members, cover, or spacers of any embodiment of the invention. In some embodiments, the surface coating is added to any surface of the form that is likely to come into contact with the moldable forming composition.

The surface coating can be made of numerous materials as described herein. In some embodiments, the surface coating is structured not to adhere to the moldable forming composition so that said form body is reusable. In some embodiments, the surface coating serves to increase or enhance the strength of the form body during bending and flexing actions. In some embodiments, the surface coating adds a particular texture to the moldable forming composition or to the form itself. In some embodiments, the surface coating conveys a substantially smooth surface to the moldable forming composition or to the form. In some embodiments, the surface coating conveys a substantially rough or textured surface to the moldable forming composition or to the form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "less" and "greater", are intended to encompass the concept of equality, thus, "less" can mean not only "less" in the strictest mathematical sense, but also, "less than or equal to."

It should also be pointed out that references may be made throughout this disclosure to figures and descriptions using terms such as "top", "side", "within", "beside", "on", and other terms which imply a relative position of a structure, portion or view. These terms are used merely for convenience and refer only to the relative position of features as shown from the perspective of the reader. An element that is placed or disposed atop another element in the context of this disclosure can be functionally in the same place in an actual product but be beside or below the other element relative to an observer due to the orientation of a device or equipment. Any discussions which use these terms are meant to encompass various possibilities for orientation and placement.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A form for forming a void of a predetermined configuration in a moldable forming composition comprising:
 a form body having a first distal end and a second distal end and first and second sides extending therebetween, said form body having a plurality of grooves extending from said first side into said form body toward said second side, said plurality of grooves being structured such that said form body is configured into a non-planar shape corresponding to the predetermined configuration of the void, and wherein said second side of said form body comprises proximate to the first distal end and the second distal end of said form body at least one slot extending from said second side into said form body toward said first side, said slots being used to secure said form body into the non-planar shape corresponding to the predetermined configuration of the void; and
 a surface coating on at least one of said first and second sides, wherein said surface coating is a film having an adhesive backing that will adhere to said form body and a relatively smooth outer surface that has limited adherence to the moldable forming composition so that said form body is reusable, wherein said film is fixedly adhered to said form body such that said film remains secured to said form body and does not need to be reapplied prior to each use.

2. A form according to claim 1, wherein the form body is made of an expanded polystyrene.

3. A form according to claim 1, wherein the spacing between each of said plurality of grooves is approximately equal.

4. A form according to claim 1, wherein the spacing between said plurality of grooves varies.

5. A form according to claim 1, wherein said plurality of grooves are parallel.

6. A form according to claim 1, wherein at least one of said plurality of grooves has a tapered configuration.

7. A form according to claim 6, wherein said at least one of said plurality of grooves is tapered from the first side toward the second side.

8. A form according to claim 1, wherein said non-planar shape comprises a U-shaped configuration.

9. A form according to claim 1, wherein said form body comprises a formable portion and a pair of lateral members.

10. A form according to claim 9, wherein said pair of lateral members and said formable portion are integrally formed.

11. A form according to claim 9, wherein said pair of lateral members and said formable portion are detachable.

12. A form according to claim 9, wherein said pair of lateral members are substantially rigid.

13. A form according to claim 1, further comprising at least one spacer structured to provide support to the form body so as to maintain the form body in the non-planar shape.

14. A form according to claim 1, further comprising at least one end cap member positioned at an end of the form body for preventing the moldable forming composition from entering the void and for providing support to the form body so as to maintain the form body in the non-planar shape.

15. A form according to claim 1, further comprising a cover positioned at an end of the form body for preventing the moldable forming composition from entering the void and for providing support to the form body so as to maintain the form body in the non-planar shape.

16. A form according to claim 1, further comprising a plurality of elongate form bodies positioned end to end.

17. A form according to claim 1, wherein the form body is bendable adjacent to said plurality of grooves.

18. A form for forming a void of a predetermined configuration in a moldable forming composition comprising:
  an adjustable form body having a first distal end and a second distal end and first and second sides extending therebetween, said form body having a plurality of grooves extending from said first side into said form body toward said second side, said plurality of grooves being structured such that said form body is configured between a first position and a second position, the first position being substantially planar and the second position forming a non-planar shape corresponding to the predetermined configuration of the void shape, and wherein said second side of said form body comprises proximate to the first distal end and the second distal end of said form body at least one slot extending from said second side into said form body toward said first side, said slots being used to secure said form body into the non-planar shape corresponding to the predetermined configuration of the void; and
  a surface coating on at least one of said first and second sides, wherein said surface coating is a film having an adhesive backing that will adhere to said form body and a relatively smooth outer surface that has limited adherence to the moldable forming composition so that said form body is reusable, wherein said film is fixedly adhered to said form body such that said film remains secured to said form body and does not need to be reapplied prior to each use.

19. An assembly for forming a drainage channel having a void with a predetermined shape using a moldable forming composition, the assembly comprising:
  a form body having:
    a first distal end and a second distal end;
    first and second sides extending between the first distal end and second distal end, at least one of the first and second sides having a surface coating, wherein the surface coating is a film having an adhesive backing that will adhere to the form body and a relatively smooth outer surface that has limited adherence to the moldable forming composition so that the form body is reusable, wherein the film is fixedly adhered to the form body such that the film remains secured to the form body and does not need to be reapplied prior to each use;
    a pair of lateral edges; and
    a plurality of grooves extending from said first side into said form body toward said second side, said plurality of grooves being structured such that said form body is configured into a non-planar shape corresponding to the predetermined configuration of the void;
    wherein said second side of said form body comprises proximate to the first distal end and the second distal end of said form body at least one slot extending from said second side into said form body toward said first side, said slots being used to secure said form body into the non-planar shape corresponding to the predetermined configuration of the void; and
  a frame for supporting the form body, the frame being attached to said slots in said second side of said form body adjacent to said lateral edges.

20. An assembly according to claim 19, wherein said form body comprises a formable portion and a pair of lateral members.

21. An assembly according to claim 20, wherein said pair of lateral members and said formable portion are integrally formed.

22. An assembly according to claim 20, wherein said pair of lateral members and said formable portion are detachable.

23. An assembly according to claim 20, wherein said pair of lateral members are substantially rigid.

24. An assembly according to claim 20, wherein each of said pair of lateral members defines a slot at least partially along the length of said form body and wherein said frame comprises a pair of elongate L-shaped members, each of said elongate L-shaped members being structured to engage a corresponding one of said slots in one of said pair of lateral members.

25. A method of forming a drainage channel having a void with a predetermined shape using a moldable forming composition, the method comprising:
  preparing a trench;
  providing a form body having:
    a first distal end and a second distal end;
    first and second sides extending between the first distal end and second distal end, at least one of the first and second sides having a surface coating, wherein the surface coating is a film having an adhesive backing that will adhere to the form body and a relatively smooth outer surface that has limited adherence to the moldable forming composition so that the form body is reusable, wherein the film is fixedly adhered to the form body such that the film remains secured to the form body and does not need to be reapplied prior to each use;
    a pair of lateral edges; and
    a plurality of grooves extending from the first side into the form body toward the second side, the plurality of grooves being structured such that the form body is configured into a non-planar shape corresponding to the predetermined configuration of the void;
    wherein the second side of the form body comprises proximate to the first distal end and the second distal end of the form body at least one slot extending from the second side into the form body toward the first side, the slots being used to secure the form body into the non-planar shape corresponding to the predetermined configuration of the void;
  attaching a frame to the slots in the second sides of the form body adjacent to the lateral edges of the form body, the frame being structured to support the form body;
  positioning the form body and frame in the trench;
  pouring a moldable forming composition in the trench about the form body;

curing the moldable forming composition to form the drainage channel; and removing the form body.

26. A method according to claim 25, wherein said attaching step comprises engaging an elongate L-shaped member into a corresponding slot in a lateral member of the form body.

27. A method according to claim 25, wherein said pouring step comprises:

pouring a first amount of moldable forming composition in the trench so as to cover the base of the frame;

at least partially curing the first amount of moldable forming composition; and pouring a second amount of moldable forming composition in the trench about the form body.

* * * * *